(12) United States Patent
Kounavis et al.

(10) Patent No.: US 9,390,320 B2
(45) Date of Patent: Jul. 12, 2016

(54) PERFORMING HAND GESTURE RECOGNITION USING 2D IMAGE DATA

(71) Applicant: Intel Corporation, Santa Clara, CA (US)

(72) Inventors: Michael Kounavis, Portland, OR (US); Rajendra Yavatkar, Portland, OR (US); Ioannis Schoinas, Portland, OR (US); Carlos Abad Vazquez, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 86 days.

(21) Appl. No.: 14/125,154

(22) PCT Filed: Jun. 10, 2013

(86) PCT No.: PCT/US2013/044885
§ 371 (c)(1),
(2) Date: Dec. 10, 2013

(87) PCT Pub. No.: WO2014/200454
PCT Pub. Date: Dec. 18, 2014

(65) Prior Publication Data
US 2015/0193656 A1 Jul. 9, 2015

(51) Int. Cl.
*G06K 9/00* (2006.01)
*G06F 3/033* (2013.01)
*G06T 7/20* (2006.01)
*G06K 9/32* (2006.01)
*G06K 9/34* (2006.01)
*G06K 9/44* (2006.01)
*G06F 3/01* (2006.01)
(Continued)

(52) U.S. Cl.
CPC ............ *G06K 9/00355* (2013.01); *G06F 3/017* (2013.01); *G06K 9/00993* (2013.01); *G06K 9/3241* (2013.01); *G06K 9/342* (2013.01); *G06K 9/44* (2013.01); *G06K 9/4638* (2013.01); *G06K 9/4652* (2013.01); *G06K 9/6221* (2013.01);
(Continued)

(58) Field of Classification Search
CPC ............ G06K 9/00993; G06K 9/4652; G06K 9/4638; G06K 9/6221; G06K 2209/21; G06F 3/017; G06T 2207/10016; G06T 7/2033
USPC ......................................... 382/165; 715/863
See application file for complete search history.

(56) References Cited

U.S. PATENT DOCUMENTS

| 5,845,007 | A | 12/1998 | Ohashi et al. |
| 6,094,508 | A | 7/2000 | Acharya et al. |

(Continued)

FOREIGN PATENT DOCUMENTS

EP 0 849 697 B1 2/2003

OTHER PUBLICATIONS

International Search Report and Written Opinion received for PCT Patent Application No. PCT/US2013/044885 mailed on Mar. 31, 2014, 14 pages.

(Continued)

*Primary Examiner* — Kanjibhai Patel
(74) *Attorney, Agent, or Firm* — Jordan IP Law, LLC

(57) ABSTRACT

Systems and methods may provide for determining a skin tone distribution for a plurality of pixels in a video signal and using the skin tone distribution to conduct one or more blob-based hand gesture determinations with respect to the video signal. In one example, the video signal includes two-dimensional (2D) image data, and the skin tone distribution has an execution time budget that is greater than an execution time budget of the blob-based hand gesture determinations.

78 Claims, 14 Drawing Sheets

(51) Int. Cl.
G06K 9/46 (2006.01)
G06K 9/62 (2006.01)

(52) U.S. Cl.
CPC ............ G06T 7/2033 (2013.01); G06K 9/6223 (2013.01); G06K 2209/21 (2013.01)

(56) References Cited

U.S. PATENT DOCUMENTS

| | | | | |
|---|---|---|---|---|
| 6,128,003 | A | * | 10/2000 | Smith et al. ................... 345/157 |
| 8,817,087 | B2 | * | 8/2014 | Weng et al. ..................... 348/77 |
| 2002/0118880 | A1 | * | 8/2002 | Liu et al. ........................ 382/199 |
| 2010/0329511 | A1 | * | 12/2010 | Yoon et al. ..................... 382/103 |
| 2011/0211754 | A1 | * | 9/2011 | Litvak et al. ................... 382/165 |
| 2011/0221974 | A1 | | 9/2011 | Stern et al. |
| 2012/0093360 | A1 | | 4/2012 | Subramanian et al. |
| 2013/0279802 | A1 | * | 10/2013 | van der Merwe ............. 382/165 |
| 2014/0068526 | A1 | * | 3/2014 | Figelman et al. .............. 715/863 |

OTHER PUBLICATIONS

International Preliminary Report on Patentability for PCT Application No. PCT/US2013/044885, mailed Dec. 23, 2015, 11 pages.

* cited by examiner

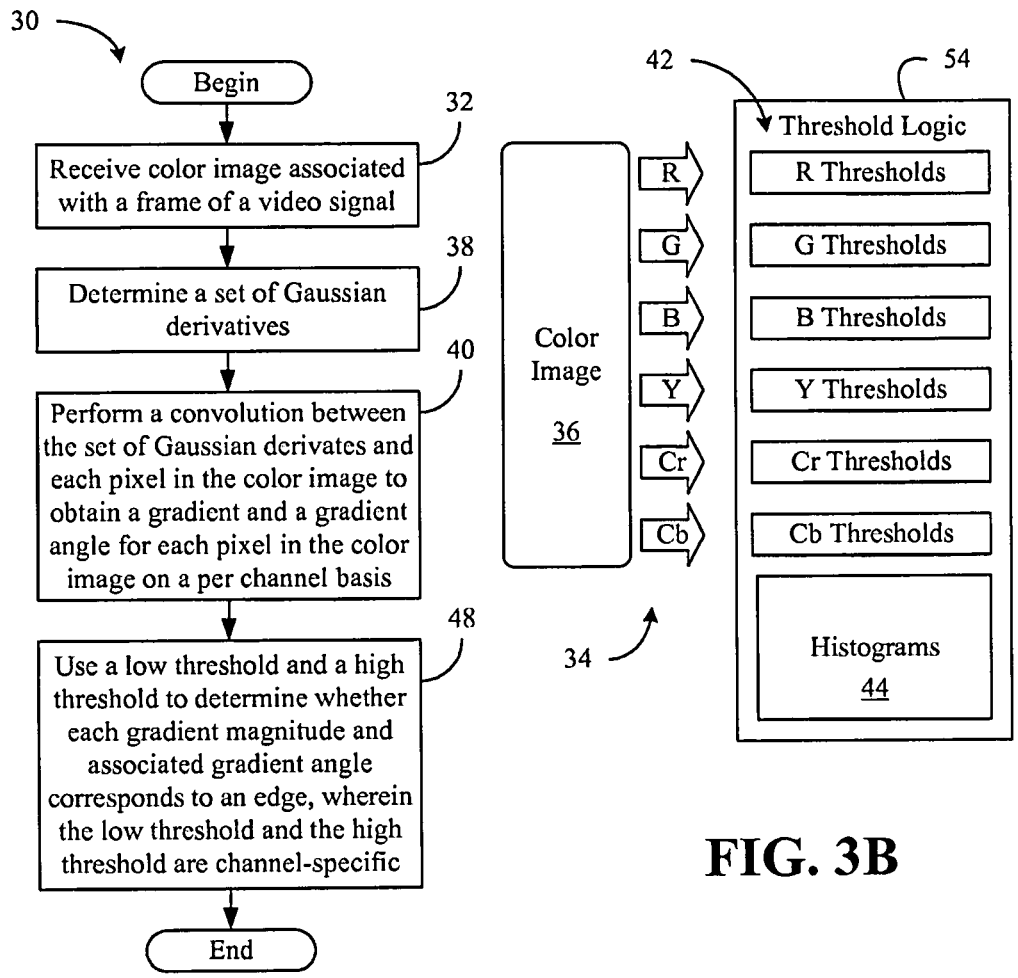
FIG. 3A
FIG. 3B
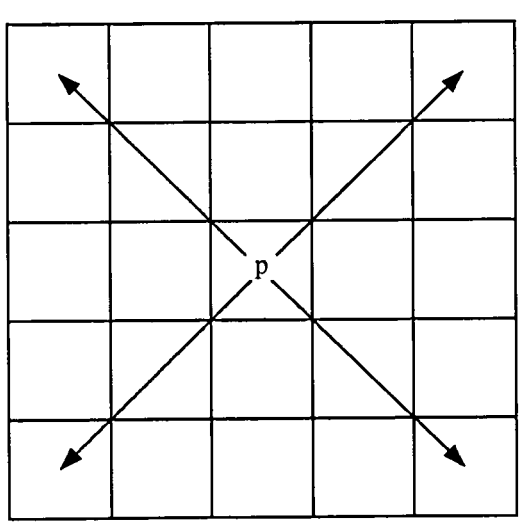
FIG. 3C

PERFORMING HAND GESTURE RECOGNITION USING 2D IMAGE DATA

TECHNICAL FIELD

Embodiments generally relate to hand gesture recognition. More particularly, embodiments relate to hand gesture recognition using two-dimensional (2D) image data.

BACKGROUND

Hand gesture recognition may be traditionally conducted using algorithms that operate directly on pixels or points of a three-dimensional (3D) cloud of data. Many of to these algorithms may use techniques that are computationally expensive when used on a frame-by-frame basis.

BRIEF DESCRIPTION OF THE DRAWINGS

The various advantages of the embodiments will become apparent to one skilled in the art by reading the following specification and appended claims, and by referencing the following drawings, in which:

FIG. 3A is a flowchart of an example of a method of detecting edges according to an embodiment;

FIG. 3B is a block diagram of an example of edge detection threshold logic according to an embodiment;

FIG. 3C is a block diagram of an example of an edge detection neighborhood of pixels according to an embodiment;

DESCRIPTION OF EMBODIMENTS

Figure 1:
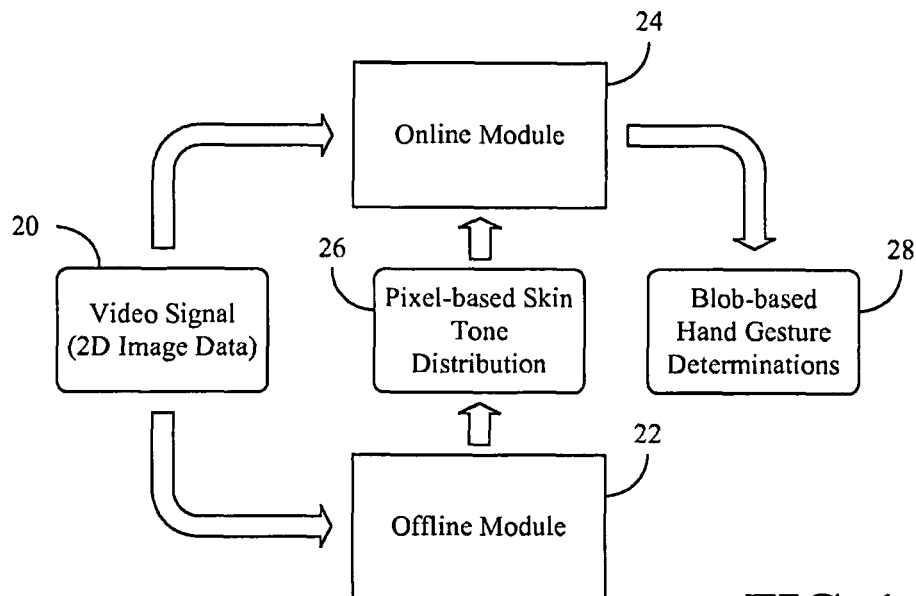
FIG. 1 is a block diagram of an example of a hand gesture determination approach according to an embodiment.

Turning now to FIG. 1, an approach to making hand gesture determinations is shown in which a video signal 20 having two-dimensional (2D) image data is processed by an offline module 22 and an online module 24. The video signal 20, which may be obtained from an image capture device and/or memory device, may contain images of a human subject performing various hand gestures associated with a wide variety of applications such as, for example, gaming, device control (e.g., computers, televisions, lights, sound systems, thermostats), and so forth. In the illustrated example, the offline module 22 determines a skin tone distribution 26 for a plurality of pixels in the video signal 20 and the online module 24 uses the pixel-based skin tone distribution to conduct one or more blob-based hand gesture determinations 28 with respect to the video signal 20. As will be discussed in greater detail, a blob may be a visual structure that has a shape similar to the shape of a Gaussian distribution (e.g., discrete kernel) in two dimensions, wherein the blob-based approach may alleviate computational complexity associated with pixel-based image analysis.

Moreover, the skin tone distribution 26 may have an execution time budget that is greater than the execution time budget of the blob-based hand gesture determinations 28 because skin tone may not be expected to vary greatly from frame to frame. For example, the skin tone distribution 26 might have an execution time budget on the order of 2-3 seconds or more, whereas the blob-based hand gesture determinations 28 may have an execution time budget of approximately 16.66 milliseconds, which would support a frame rate of 60 frames per second that may commonly be used in gaming applications.

Figure 2:
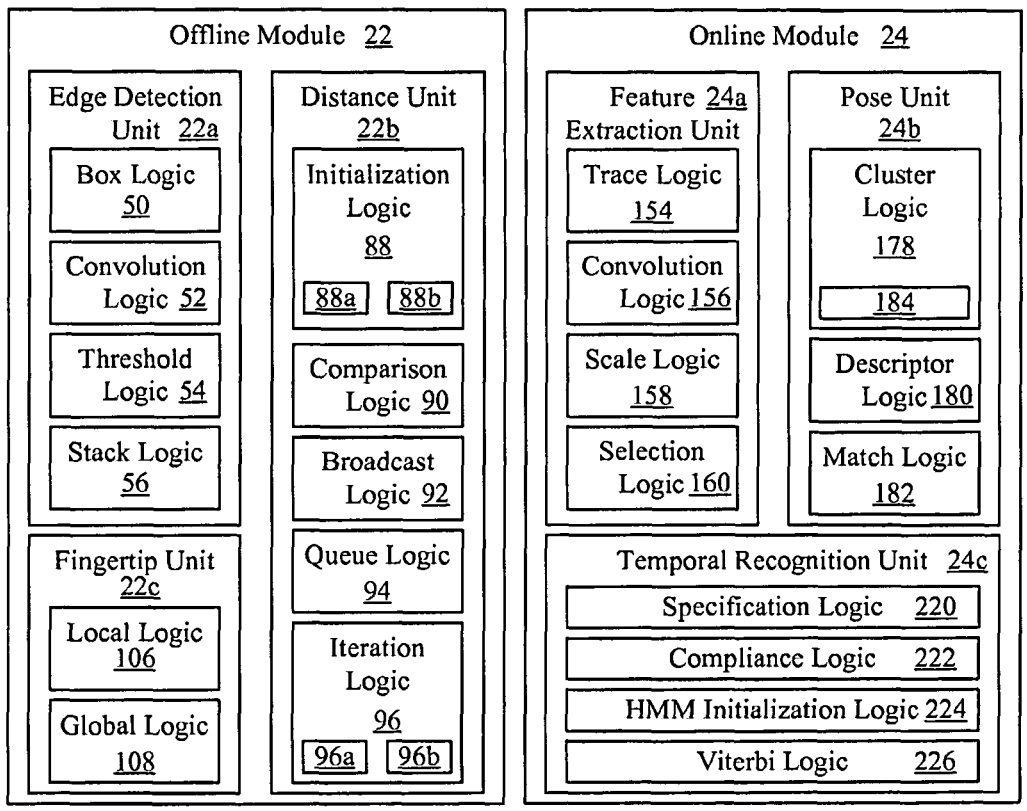
FIG. 2 is a block diagram of an example of an architecture to conduct hand gesture determinations according to an embodiment.

FIG. 2 shows one example of an architecture having an offline module 22 (22a-22c) and an online module 24 (24a-24c) to conduct hand gesture determinations. In general, the architecture may be implemented as gesture detection pipeline that supports real-time recognition of hand gestures with minimal complexity and processing overhead. The gesture detection pipeline may be implemented as a software realization in the form of processor instructions stored in some machine readable medium, which if executed cause a processor to conduct hand gesture determinations, as a hardware realization in the form of an apparatus including a plurality of logic circuits which if supplied with clock and power signals cause the apparatus to conduct hand gesture determinations, or as a realization resulting from combining the hardware and software realizations. Similarly, the terms "unit" and "logic" may refer to either a software realization, a hardware realization or a combined hardware/software realization.

In one example, the offline module 22 includes an edge detection unit 22a that receives color images associated with frames of a video signal and conducts an edge analysis on the color images for each of a plurality of channels. Additionally, a distance unit 22b may identify edge maps associated with the edge analysis and iteratively propagate nearest neighbor information between pixels in the edge maps to obtain distance maps. The illustrated offline module 22 also includes a fingertip unit 22c to identify sets of contour line pixels that surround a plurality of fingertips in the color images based on the edge maps and the distance maps, wherein the skin tone distributions may be determined based on color values for pixels inside the sets of contour line pixels. As already noted, the skin tone distributions may be determined at a relatively slow rate, depending upon the circumstances.

The online module 24 may remove non-skin pixels from input frames of the video signal based on the skin tone distributions and sub-sample the input frames (e.g., skipping d rows or d columns in each dimension repeatedly, where d is a tunable parameter) to obtain modified frames. In one example, the online module 24 includes a feature extraction unit 24a that identifies a plurality of blobs in the modified frames. A pose unit 24b may match one or more poses associated with the plurality of blobs to one or more poses stored in a library, wherein a temporal recognition unit 24c may identify a plurality of observation trajectories for the one or more poses and maintain scores for the plurality of observation trajectories simultaneously. The temporal recognition unit 24c may also use the scores to conduct the blob-based hand gesture determinations. The components of the hand detection pipeline are discussed in greater detail below.

Offline Edge Detection

With continuing reference to FIGS. 2 and 3A-3C, a method 30 of detecting edges is shown. Illustrated processing block 32 provides for receiving a color image 36 associated with a frame of a video signal, wherein an edge analysis may generally be conducted on the color image 36 for each of a plurality of channels 34. In this regard, the color image 36 may include RGB (red/blue/green) data as well as Y-luminosity (Y), chromatic red (Cr) and chromatic blue (Cb) data, wherein a pixel may be deemed an edge pixel if is it is determined to be an edge pixel in any of the channels 34.

More particularly, a set of Gaussian derivates may be determined at block 38 for each channel in the plurality of channels 34. For example, the expression below may be used to obtain the first order Gaussian derivatives in two dimensions.

$$g_x(x, y) = \frac{-x}{2\pi\sigma^4} \cdot e^{-\frac{x^2+y^2}{2\sigma^2}} \quad (1)$$

$$g_y(x, y) = \frac{-y}{2\pi\sigma^4} \cdot e^{-\frac{x^2+y^2}{2\sigma^2}} \quad (2)$$

Where $\sigma$ is the variance parameter for the Gaussian derivative. Illustrated block 40 performs a convolution between the set of Gaussian derivatives and each pixel in the color image 36 to obtain a gradient magnitude and a gradient angle for each pixel in the color image 36 on a per channel basis. Moreover, the variance parameter may be set to a value greater than one (e.g., $\sigma$=4), which may help significantly with removing edge pixels associated with rough texture (e.g., de-noising). Such pixels may not be of interest in certain gesture recognition applications.

Once the gradient magnitude and angle are computed, two magnitude thresholds 42 may be defined for each channel: a high threshold and a low threshold. The thresholds 42 may be determined by building a separate histogram of the gradient magnitude values in each of the plurality of channels 34. The histograms 44 may therefore enable the thresholds 42 to be determined empirically rather than on an absolute basis. In each channel, a low and a high threshold value may be defined as those magnitude values that separate, for example, the "best" 8% and 35% of the pixels, respectively, from the remaining pixels. By best, we may refer to the pixels with the highest gradient magnitude values. These threshold percentages may derive observations on relatively large image sets.

As already noted, each channel may use a separate threshold pair. Convolutions with Gaussian derivatives may be performed using matrices that contain a plurality of first order Gaussian derivative values, where each first order Gaussian derivative value is computed using equations (1) and (2), and converted to the integer form. Conversion to the integer form may be realized via division with the smallest value in a matrix.

Once the thresholds 42 are defined, the low thresholds may be used to detect "thin" edge pixels, which may be passed to a second filtering stage where the pixels that remain are associated with local gradient magnitude maxima appearing along the gradient angle. From among these thin edge pixels, pixels with a gradient magnitude value higher than the high threshold may be marked as "thick" edge pixels and loaded onto a stack. Then, pixels may be removed from the stack one-by-one and subjected to a neighborhood examination that determines whether neighborhood of pixels around the edge pixel includes additional edge pixels. If a neighbor is a thin edge pixel, it may be marked as a thick edge and further added to the stack. The process may terminate when there are no more pixels to add (e.g., the stack is empty).

As best seen in FIG. 3C, the neighborhood of pixels 46 around a particular pixel "p" may include pixels that are non-adjacent to the pixel p. In addition, before marking a thin edge pixel as a thick edge pixel, a check may be conducted as to whether the slope of the line of the line connecting pixel p and the neighboring pixel q is perpendicular to the gradient at p or q. Such an approach may enable the detection of more contour line pixels, which may otherwise be dropped under traditional approaches. In the illustrated example, a 5×5 neighborhood is used, but other neighborhood sizes may also be used.

Thus, illustrated block 48 provides for using a low threshold and a high threshold to determine whether each gradient magnitude and associated gradient angle corresponds to an edge, wherein the low threshold and the high threshold are channel-specific. Block 48 may involve building, for each channel in the plurality of channels 34, a histogram of gradient magnitudes and determining the low threshold and the high threshold based on the histogram.

In one example, the edge detection unit 22a includes box logic 50 to, for each channel in the plurality of channels 36, determine a set of Gaussian derivatives, and convolution logic 52 to perform a convolution between the set of Gaussian derivatives and each pixel in the color image to obtain a gradient magnitude and a gradient angle for each pixel in the color image on a per channel basis. The box logic 50 may also set the variance parameter of the set of Gaussian derivatives to a value greater than one, as already discussed. Additionally, threshold logic 54 may use a low threshold and a high threshold to determine whether each gradient magnitude and associated gradient angle corresponds to an edge, wherein the low threshold and the high threshold are channel-specific. The threshold logic 54 may also build, for each channel in the plurality of channels, a histogram of gradient magnitudes and determine the low threshold and the high threshold based on the histogram. The illustrated edge detection unit 22a also includes stack logic 56 to identify one or more edge pixels and determine whether a neighborhood of pixels 46 around the edge pixels includes additional edge pixels. The neighborhood of pixels 46 may include one or more pixels that are non-adjacent to the edge pixels, as already discussed.

Edge detection techniques described herein may therefore accurately identify edges associated with changes in color hue, lightness, saturation or combinations thereof. Additionally, accuracy may be enhanced by using adaptive thresholds to separate pixels into edge pixels and non-edge pixels.

Offline Distance Determination

Figure 4:
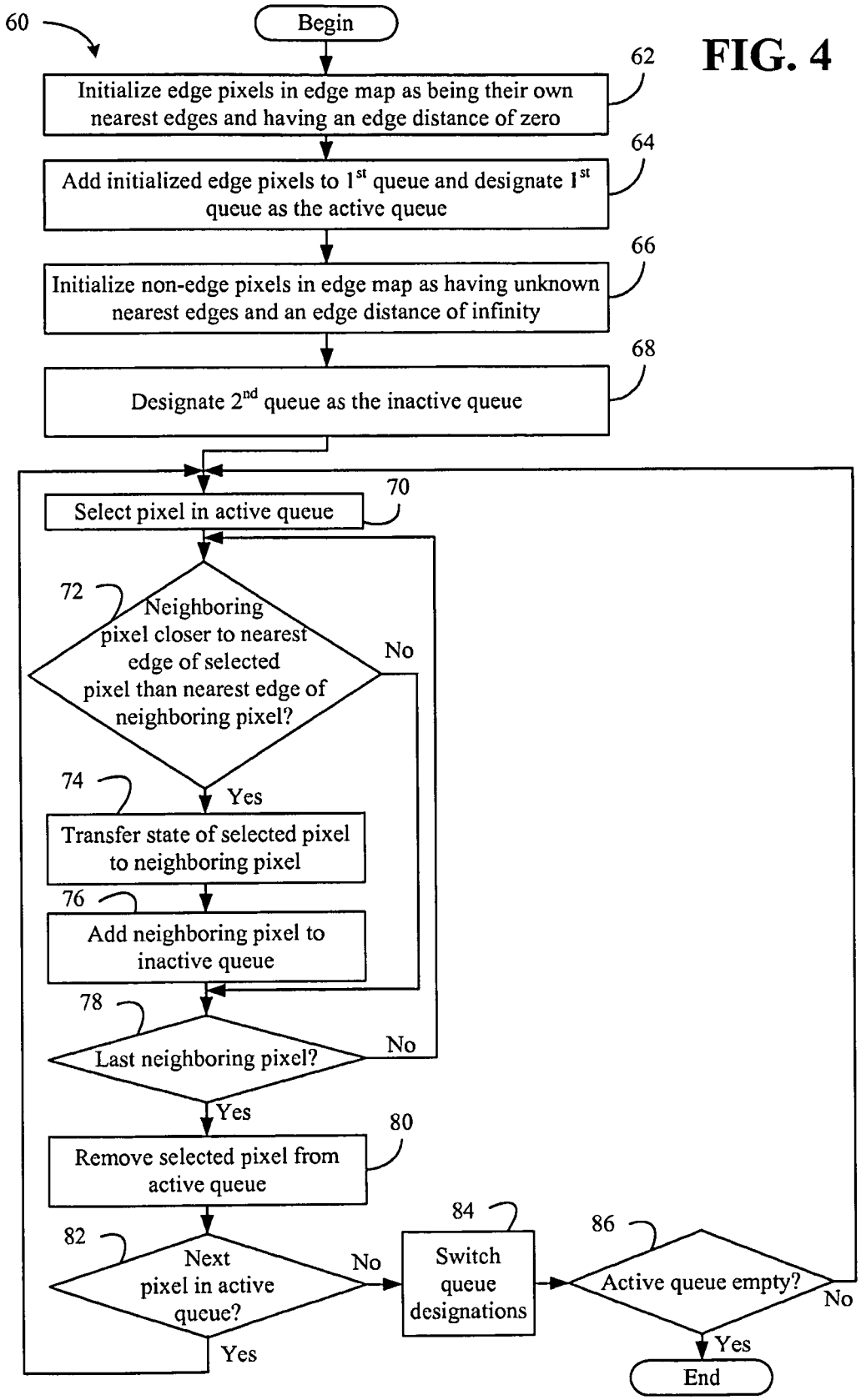
FIG. 4 is a flowchart of an example of a method of generating distance maps according to an embodiment.

As already noted, the offline module 22 may also have a distance unit 22*b* to identify an edge map associated with the edge analysis conducted by the edge detection unit 22*a*, and iteratively propagate nearest neighbor information between pixels in the edge map to obtain a distance map. With continuing reference to FIGS. 2 and 4, a method 60 of generating distance maps is shown. A distance map may be a two-dimensional discrete signal associated with the same width and height (i.e., frame dimensions) as an edge map, which, for every discrete point (i.e., pixel) in the distance map, holds the distance to a closest edge pixel in the edge map as well as the coordinates of the closest edge pixel. Illustrated processing block 62 initializes edge pixels (e.g., "landmarks") in the edge map as being their own nearest edges and having an edge distance of zero, wherein the initialized edge pixels may be added to a first ($1^{st}$) queue at block 64. Block 64 may also provide for designating the first queue as an active queue. Additionally, non edge pixels in the edge map may be initialized as having unknown nearest edges and an edge distance of infinity by a block 66. Illustrated block 68 designates a second ($2^{nd}$) queue, initially empty, as an inactive queue.

Illustrated block 70 selects a pixel in the active queue and illustrated block 72 conducts a distance determination as to whether a first distance between a neighboring pixel and a nearest edge of the pixel in the active queue is less than or equal to a second distance between the neighboring pixel and a current nearest edge of the neighboring pixel. If so, the neighboring pixel is closer to the nearest edge of the selected pixel and illustrated block 74 conducts a transfer of the state of the pixel in the active queue to the state of the neighboring pixel. As part of this transfer of state the second distance in the state of the neighboring pixel is replaced by the first distance, determined by block 72. Additionally, the neighboring pixel may be added to the inactive queue at block 76. If the neighboring pixel is not closer to the nearest edge of the selected pixel, the state transfer and addition of the neighboring pixel may be bypassed.

In addition, a determination may be made at block 78 as to whether all neighboring pixels of the selected pixels have been examined. If not, a repeat of the distance determination, the transfer of the state and the addition of the neighboring pixel to the inactive queue for the remaining neighboring pixels for the selected pixel takes place. Illustrated block 80 removes the selected pixel from the active queue, wherein a determination may be made at block 82 as to whether the active queue contains additional pixels. If so, the illustrated process may be repeated for each pixel in the active queue. Block 84 may provide for switching the queue designations by designating the first queue as the inactive queue and the second queue as the active queue. If it is determined at block 86 that the newly designated active queue contains pixels, the illustrated process may be repeated until the active queue is empty.

The illustrated approach may therefore treat pixels in the edge map as nodes that "broadcast" nearest neighbor information to their neighbors, updating their own state as they receive broadcasts from neighbors. Moreover, it has been determined that the distance error introduced by the illustrated approach cannot exceed two pixels per distance determination, with actual error being even smaller. For example, tests on sixty-eight images of VGA (Video Graphics Array) resolution, completely correct nearest edge maps were computed in fifty-eight out of the sixty-eight images. For the remaining ten images, only a single pixel out of 307,200 contained an incorrect distance value, and the distance that pixel was different from the correct distance by only one pixel.

Thus, the distance unit 22*b* may include initialization logic 88 (88*a*, 88*b*) having first initialization logic 88*a* to initialize edge pixels in the edge map as being their own nearest edges and having an edge distance of zero, add the initialized edge pixels to the first queue and designate the first queue as an active queue. Second initialization logic 88*b* to initialize non-edge pixels in the edge map as having unknown nearest edges and an edge distance of infinity and designate a second queue as an inactive queue. Additionally, comparison logic may, for each pixel in the active queue, conduct a distance determination as to whether a first distance between a neighboring pixel and a nearest edge of the pixel in the active queue is less than or equal to a second distance between the neighboring pixel and a current nearest edge of the neighboring pixel.

The distance unit 22*b* may also include broadcast logic 92 to conduct a transfer of a state of the pixel in the active queue to a state of the neighboring pixel if the first distance is less than or equal to the second distance. Queue logic 94 may conduct a removal of the pixel in the active queue from the active queue and an addition of the neighboring pixel to the inactive queue if the first distance is less than or equal to the second distance. Additionally, the distance unit 22*b* may include iteration logic 96 (96*a*, 96*b*) having first iteration logic 96*a* to repeat a first invocation of the comparison logic 90, the broadcast logic 92 and the queue logic 94 (e.g., except for the removal of the selected pixel from the active queue) for each neighboring pixel of the pixel in the active queue. Second iteration logic 96*b* may conduct a first designation of the first queue as the inactive queue, a second designation of the second queue as the active queue, and repeat a subsequent invocation of the comparison logic 90, the broadcast logic 92, the queue logic 94 and the first iteration logic 96*a* until the active queue is empty.

Offline Fingertip Detection

Figure 5A:
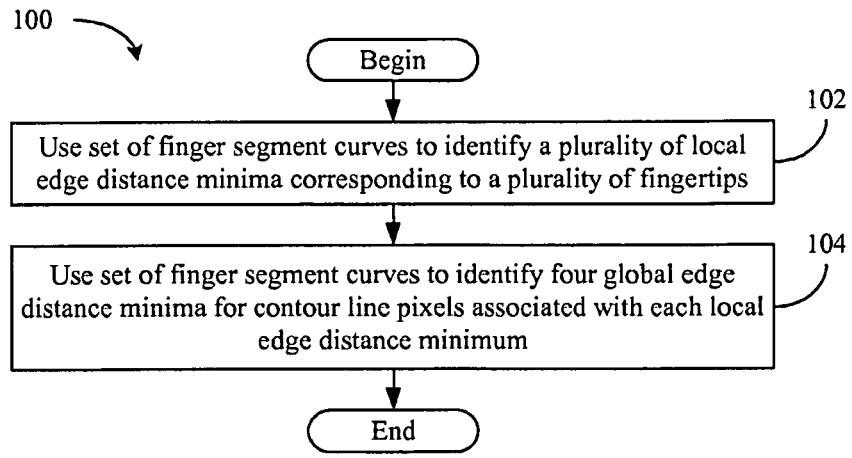
FIG. 5A is a flowchart of an example of a method of identifying a set of contour line pixels according to an embodiment.
Figure 5B:
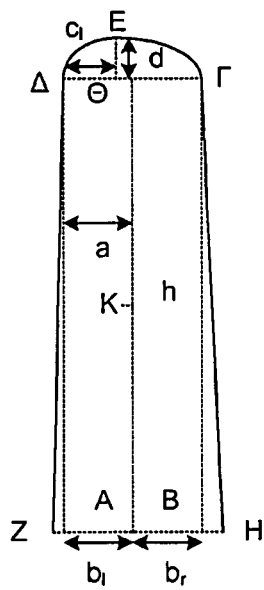
FIG. 5B is an illustration of an example of a set of contour lines according to an embodiment.

The offline module 22 may also have a fingertip unit 22*c* to identify a set of contour line pixels that surround a plurality of fingertips in a color image based on the edge map from the edge detection unit 22*a* and the distance map from the distance unit 22*b*, as already noted. With continuing reference to FIGS. 2, 5A and 5B, a method 100 of identifying a set of contour line pixels is shown. Illustrated block 102 uses a set of finger segment curves to identify a plurality of local edge distance minima corresponding to the plurality of fingertips, wherein the plurality of fingertips includes one or more of an index fingertip, a middle fingertip, a ring fingertip, or a pinky fingertip. As best shown in FIG. 5B, the set of finger segment curves may include a concatenation of two line segments (e.g., segments ΔZ and ΓH) and two ellipse segments (e.g., segments ΔE and ΓE), wherein block 102 conducts a coarse exhaustive search to determine, for each finger, the areas of the edge and distance maps that most closely match a concatenation of segments. The set of finger segment curves may then be used at block 104 to identify four global edge distance minima for contour line pixels associated with each local edge distance minimum and with the four following finger types: pinky, ring, middle and index. Thus, block 102 might generally identify fingertip areas in the image, whereas block 104 might identify which fingertip corresponds to which area.

Thus, the fingertip unit 22*c* may include local logic 106 to use a set of finger segment curves to identify a plurality of local edge distance minima corresponding to the plurality of fingertips and global logic 108 to use the set of finger segment curves to identify four global edge distance minima for contour line pixels associated with each local edge distance minimum. The skin tone distribution 26 (FIG. 1) may therefore be determined based on color values for pixels inside the set of contour line pixels identified by the fingertip unit 22c.

Online Feature Extraction

As already noted, the online module 24 may have a feature extraction unit 24a to identify a plurality of blobs in each modified frame, wherein a blob may be a visual structure that has a shape similar to the shape of a Gaussian kernel in two dimensions. With continuing reference to FIGS. 2 and 6A-6E, a method 110 of identifying blobs is shown in which illustrated block 112 removes non-skin pixels from input frames associated with the video signal based on the skin tone distribution. Block 112 may also sub-sample the input frames to obtain a plurality of modified frames (e.g., image pyramid). Sub-sampling may involve, for example, skipping d rows or d columns in each dimension repeatedly, where d is a tunable parameter.

For each of the pixels that remain, a number of convolution operations may take place, wherein each of the convolution operations may use a 9×9 convolution box. Convolutions may take place on gray scale representations of the original frame or gray scale representations of a plurality of modified frames. Non-skin pixels in gray scale representations of original or modified frames may be associated with an intensity level of zero. Each convolution box may be created from values of a Hessian trace function, which may be determined at block 114. In one example, an expression such as the expression below is used for the Hessian trace function.

$$h(x, y) = ((x - \mu_x)^2 + (y - \mu_y)^2 - 2\sigma^2) \cdot \frac{e^{-\frac{(x-\mu_y)^2 + (y-\mu_y)^2}{2\sigma^2}}}{2\pi \cdot \sigma^4} \quad (3)$$

Where $\mu_x, \mu_y$ is the center of the convolution box and $\sigma$ is the variance parameter (e.g., "scale") of its corresponding Gaussian kernel. The scale may be equal to one third of the radius of a hand blob that is detected using the convolution box.

For each pixel in the modified frame, illustrated block 116 performs a convolution between the Hessian trace function and a set of non-adjacent pixels associated with the pixel in the modified frame to obtain a convolution score. The set of non-adjacent pixels may have a spacing that is set of a closest integer to three quarters the variance parameter (0.75σ) of the Hessian trace function. Moreover, the values of each convolution box may be floating point, or normalized to integer values through division with a normalization parameter (e.g., the smallest floating point value in the box).

Figure 6A:
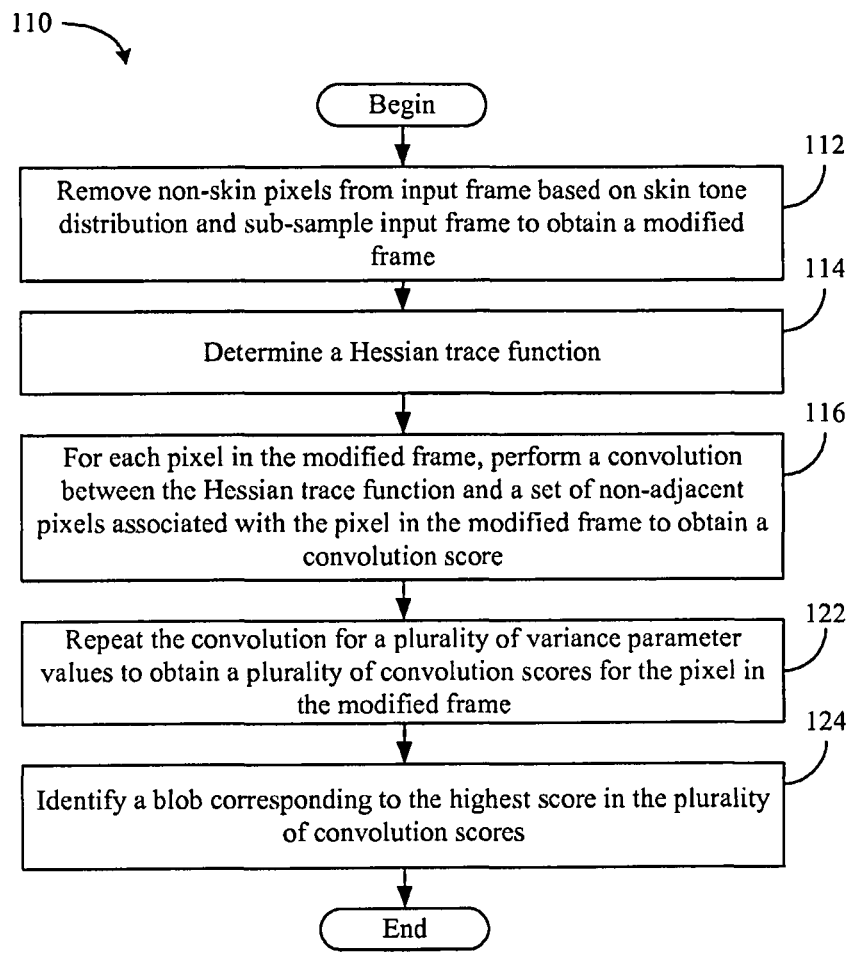
FIG. 6A is a flowchart of an example of a method of identifying blobs according to an embodiment.
Figure 6B:
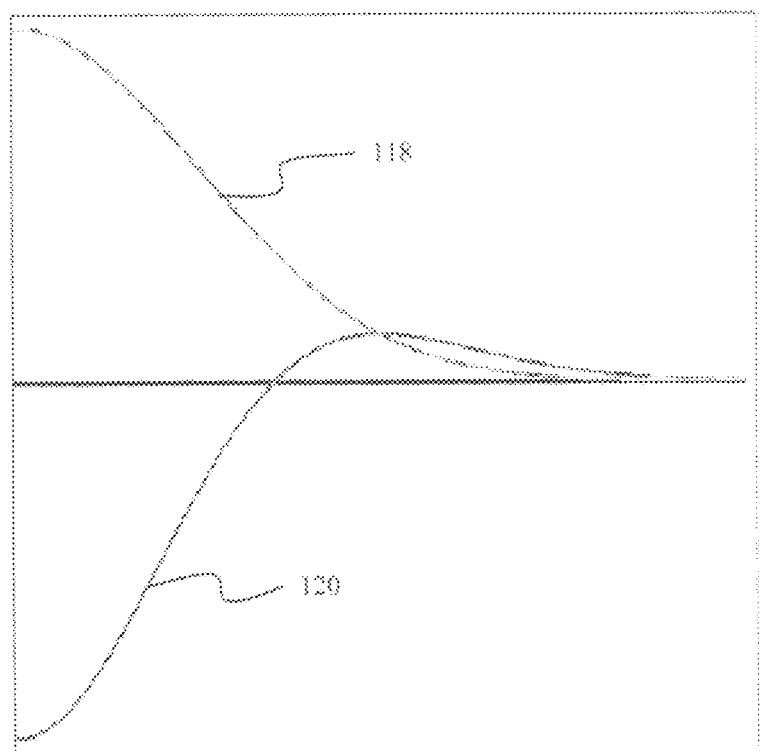
FIG. 6B is a plot of an example of a Gaussian kernel and a detector according to an embodiment.
Figure 6C:
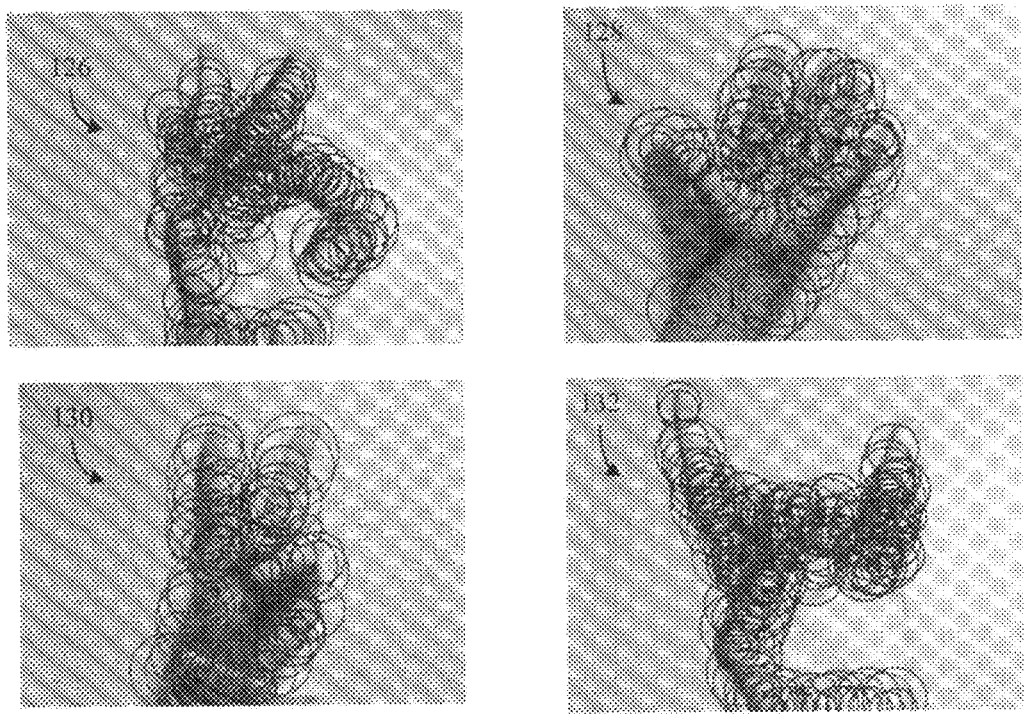
FIG. 6C is an illustration of a set of hand poses and corresponding blob arrangements according to an embodiment.

As best seen in FIG. 6B, a Gaussian kernel curve 118 and a detector curve 120 are shown, wherein the illustrated detector curve 120 corresponds to a particular blob size. In this regard, the convolution may be repeated at block 122 for a plurality of variance parameter values to obtain a plurality of convolution scores for the pixel in the modified frame, wherein the convolution score is maximized if the detector curve 120 has the same mean and variance (e.g., width) as the Gaussian kernel curve 118. The blob corresponding to the highest score in the plurality of convolution scores may be identified at block 124. As best shown in FIG. 6C a given hand pose in an image may have a particular arrangement of blobs depending upon the results of the convolutions. In the illustrated example, an "okay" pose 126, an open palm pose 128, a "peace sign" pose 130 and a "horns" pose 132 all have different blob configurations.

Not all possible scale values need to be taken into account when performing convolutions. For example, it may be sufficient to increment the scale value by one quarter of that value and still achieve accurate blob detection (e.g., each parameter value is a one quarter increment of an immediately preceding variance parameter value). Thus, if a starting scale value of four pixels is used, a group of thirteen scales may be constructed that covers a relatively large set of hand sizes that may be present in an image: 4, 5, 6, 7, 8, 10, 12, 14, 16, 20, 24, 28, 32. The highest scale value of 32 may correspond to a palm diameter upper bound of 6×32=192 pixels, which may be suitable in VGA resolution video. Adding more scale values may enable detection of an extended set of hand sizes. Furthermore, for a predetermined set of scales, the values of their corresponding convolution boxes may be determined in advance and treated as constants when processing each frame online.

In general, single instruction multiple data (SIMD) commands may be used to efficiently perform the convolutions. The method described below may be referred to as a SIMD convolution method. For example, the elements of the convolution boxes may be placed in relatively large vectors, row by row, at appropriate element positions, respecting the gaps that exist between the pixels where the convolution boxes apply. The elements of the convolution boxes may then be replicated several times so that multiple boxes centered at different—but neighboring—pixels are present in the same large vectors. Next, convolutions may be performed by multiplying large vectors containing the image pixel values with large vectors containing convolution boxes on an element-by-element basis. Moreover, convolution results may be computed by taking the sums of selected products resulting from previous multiplications.

Figure 6D:
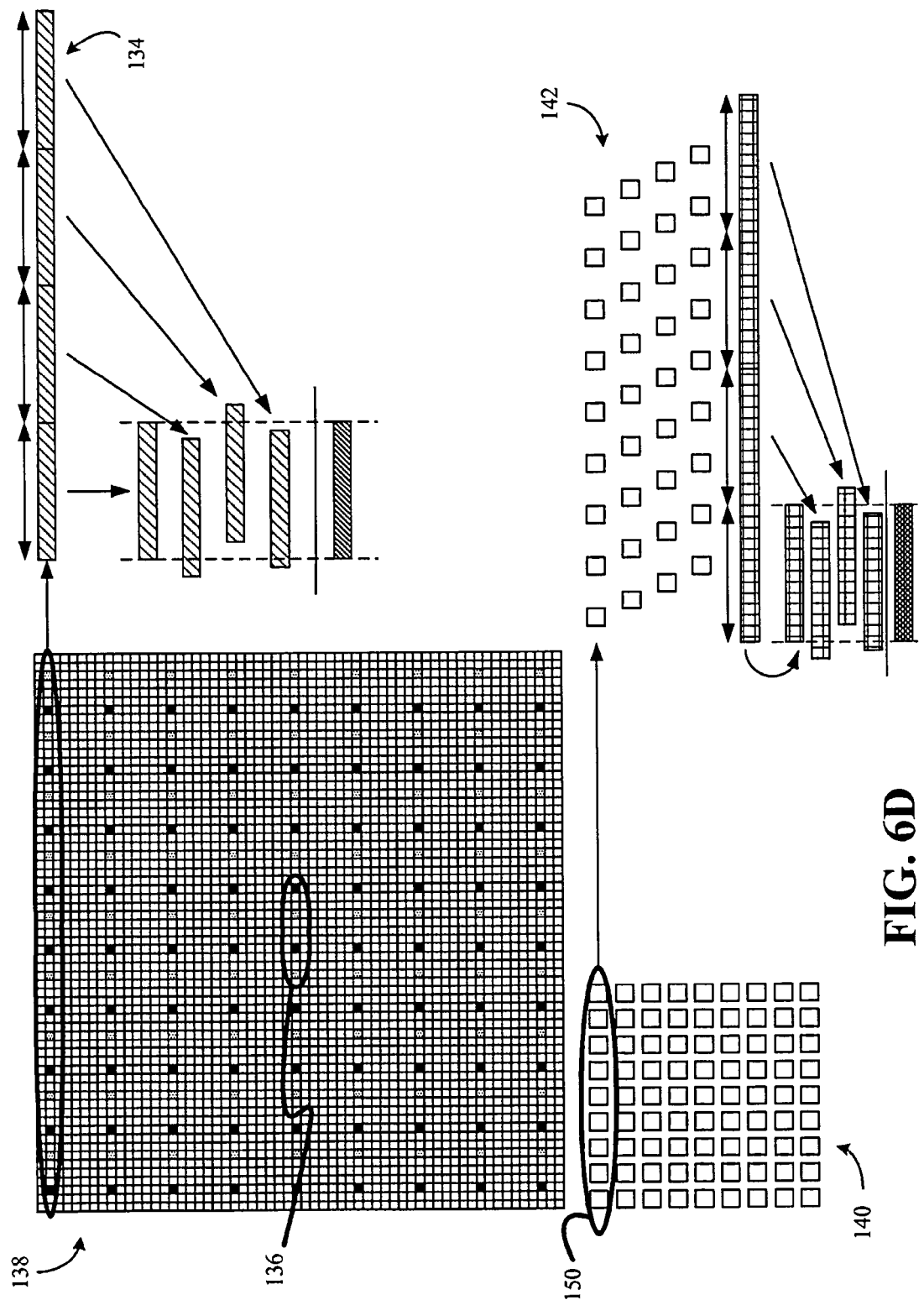
FIG. 6D is a block diagram of an example of a convolution approach according to an embodiment.

For example, FIG. 6D shows a convolution approach that may be repeated once per line (as shown, nine lines are used), for each four convolution boxes, per scale (e.g., variance parameter), and per image. In the illustrated example, four vectors 134 of pixels for a set of pixels of interest (PoI) 136 at the center of corresponding convolution boxes are read from an image 138 and combined. Additionally, each line 150 of a Hessian matrix 140 may be expanded to the extension of one line in the image 138 according to the scale being used. In the illustrated example, the Hessian matrix 140 is for a scale of 32 and there are thirteen different Hessian matrices (one per scale). Several copies 142 of the expanded line may be combined to compute several points at the same time.

Figure 6E:
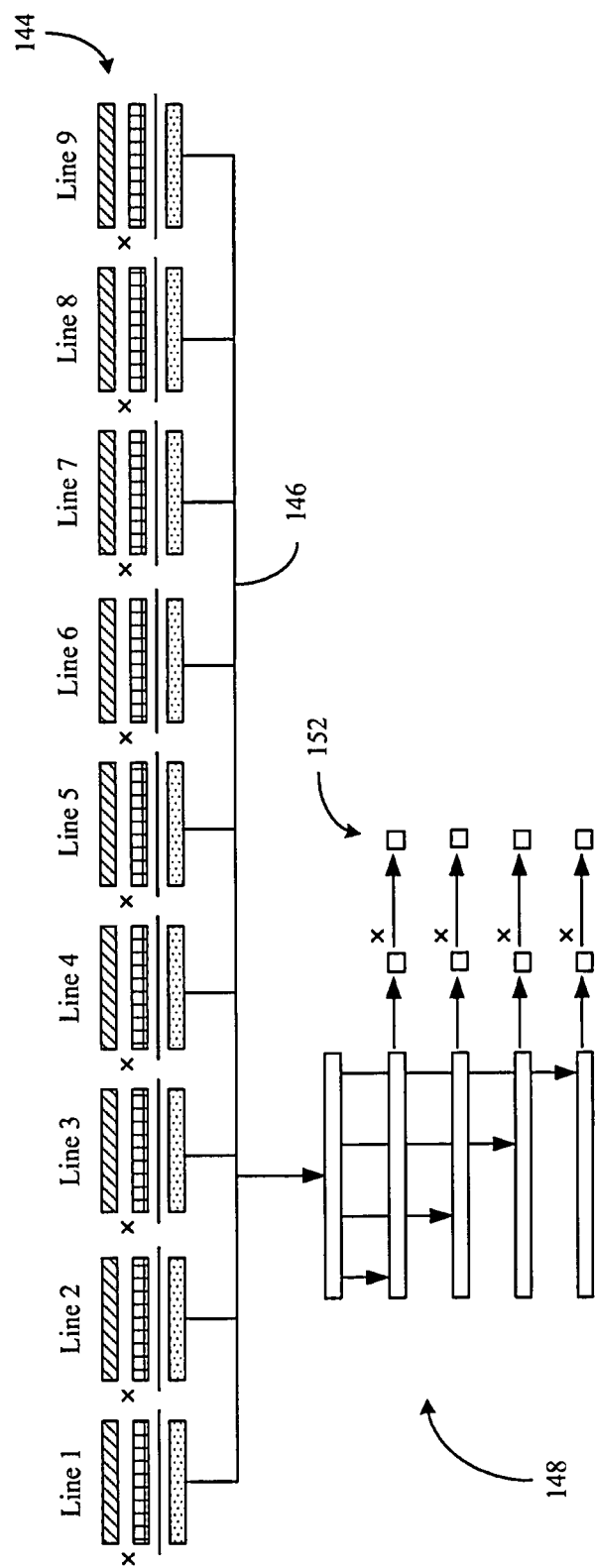
FIG. 6E is a block diagram of an example of a vector processing approach according to an embodiment.

Additionally, FIG. 6E demonstrates a vector multiplication that may be conducted for each of a plurality of lines 144, followed by a vector addition 146. The elements of the result of the vector addition 146 may be separated into a plurality of different vectors 148 in order to perform intra-addition operations and obtain results corresponding to the four contiguous convolution boxes associated with the PoIs 136 and the scale value in question (e.g., scale 32).

Thus, the feature extraction unit 24a may include Hessian trace logic 154 to determine a Hessian trace function, and convolution logic 156 to, for each pixel in an original frame or a plurality of modified (e.g., sub-sampled) frames, perform a convolution between the Hessian trace function and a set of non-adjacent pixels associated with the pixel in the modified frame to obtain a convolution score. In one example, the convolution logic 156 uses a 9×9 convolution box and one or more SIMD commands to perform the convolution. As already noted, the set of non-adjacent pixels may have a spacing of a closest integer to three quarters the variance parameter of the Hessian trace function. Additionally, scale logic 158 may invoke the convolution logic for a plurality of variance parameter values to obtain a plurality of convolution scores for the pixel in the modified frame. In one example, one or more variance parameter values in the plurality of variance parameter values is a one quarter increment of an immediately preceding variance parameter value. The illustrated feature extraction unit 24a also includes selection logic 160 to identify the blob corresponding to the highest score in the plurality of convolution scores.

Online Pose Matching

As already noted, the online module 24 may also have a pose unit 24b to match one or more poses associated with a plurality of blobs to one or more poses stored in a library. In general, the pose unit 24b may create "descriptors" of a palm complex and use those descriptors for hand tracking and hand pose matching. Hand tracking may be the process of identifying the location of a palm complex in frames coming from a continuous video stream/signal, whereas pose matching may be the process of classifying the hand silhouette as associated with one or more pre-defined hand poses (e.g., thumbs up, peace sign, etc.).

With continuing reference to FIGS. 2 and 7A-7C, a method 162 of identifying hand poses is shown. Illustrated block 164 provides for grouping a plurality of blobs into a plurality of clusters. Each blob may generally be described in terms of a pair of x-y coordinates, denoting the location of the center, radius and convolution score of the blob. The convolution score may denote the proximity of a visual present in a frame in x-y coordinates to the shape of a two-dimensional (2D) Gaussian kernel.

In one example, the blobs are grouped into k-means clusters that are created in order to separate hand blobs from blobs associated with different skin areas such as, for example, faces, arms and elbows. In general, k-means clustering may provide for placing centroids as far away from one another as possible and associating each blob with the nearest centroid to obtain an "early groupage". When no blobs are pending, k new centroids may be re-calculated as "barycenters" of the clusters resulting from the early groupage. Once the k new centroids have been determined, a new binding may be done between the blobs and the nearest new centroid. The result may be a loop in which the k centroids change their location step-by-step until no more changes are done. Additionally, the blobs may be weighted according to size in the k-means clustering.

For example, weighted k-means may be performed on all blobs passed as input for various values k, e.g., 2, . . . , K, where the largest value K is a tunable parameter. In all iterations, the starting values may be obtained by performing the same weighted k-means clustering operating on a subset of the input blobs and arbitrary starting values. Moreover, some blob property may be used as weight when calculating the next cluster centroid. For example, a value such as the blob radius may be used as weight. The x-coordinate of the cluster centroid may be computed as a weighted sum of a plurality of x-coordinates of the centers of all blobs in a cluster, where each x-coordinate is multiplied with a corresponding weight, which may be equal to a blob radius, and the weighted sum is further divided by the sum all weights. Similarly, the y-coordinate of the cluster centroid may be computed as a weighted sum of a plurality of y-coordinates of the centers of all blobs in a cluster, where each y-coordinate is multiplied with a corresponding weight, which may be equal to a blob radius, and the weighted sum is further divided by the sum all weights. In another embodiment, a blob weight may be equal to the square of the blob radius. In yet another embodiment, a blob weight may be equal to the cube of the blob radius. In addition, for each of the clusters, a radius and pair of x-y centroid coordinates may be computed as a function of the radii and coordinates of the blobs of each cluster.

Figure 7A:
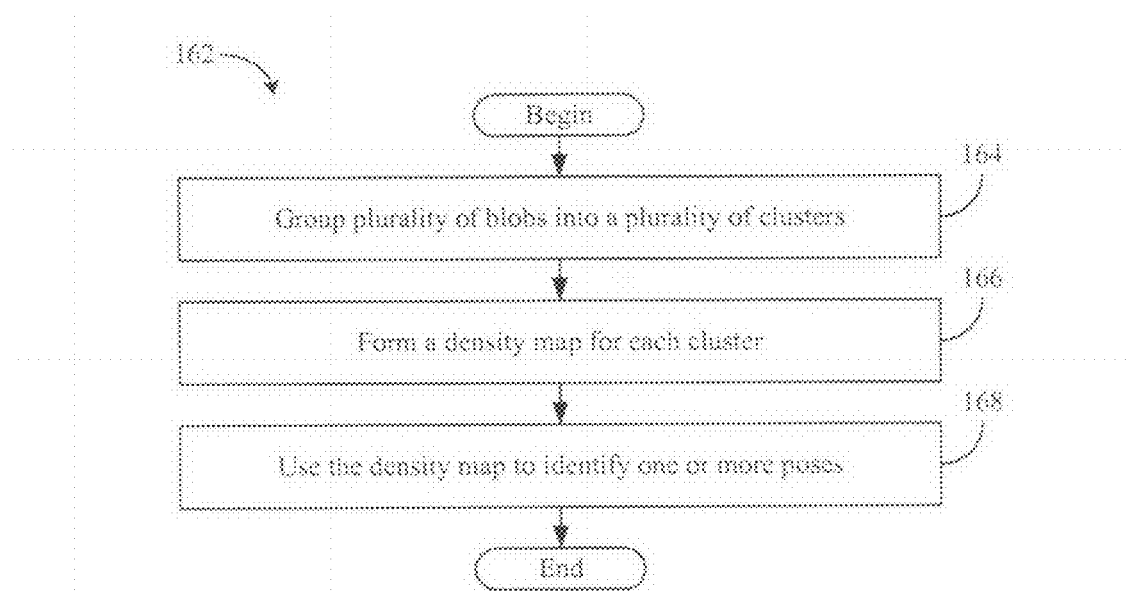
FIG. 7A is a flowchart of an example of a method of identifying hand poses according to an embodiment.
Figure 7B:
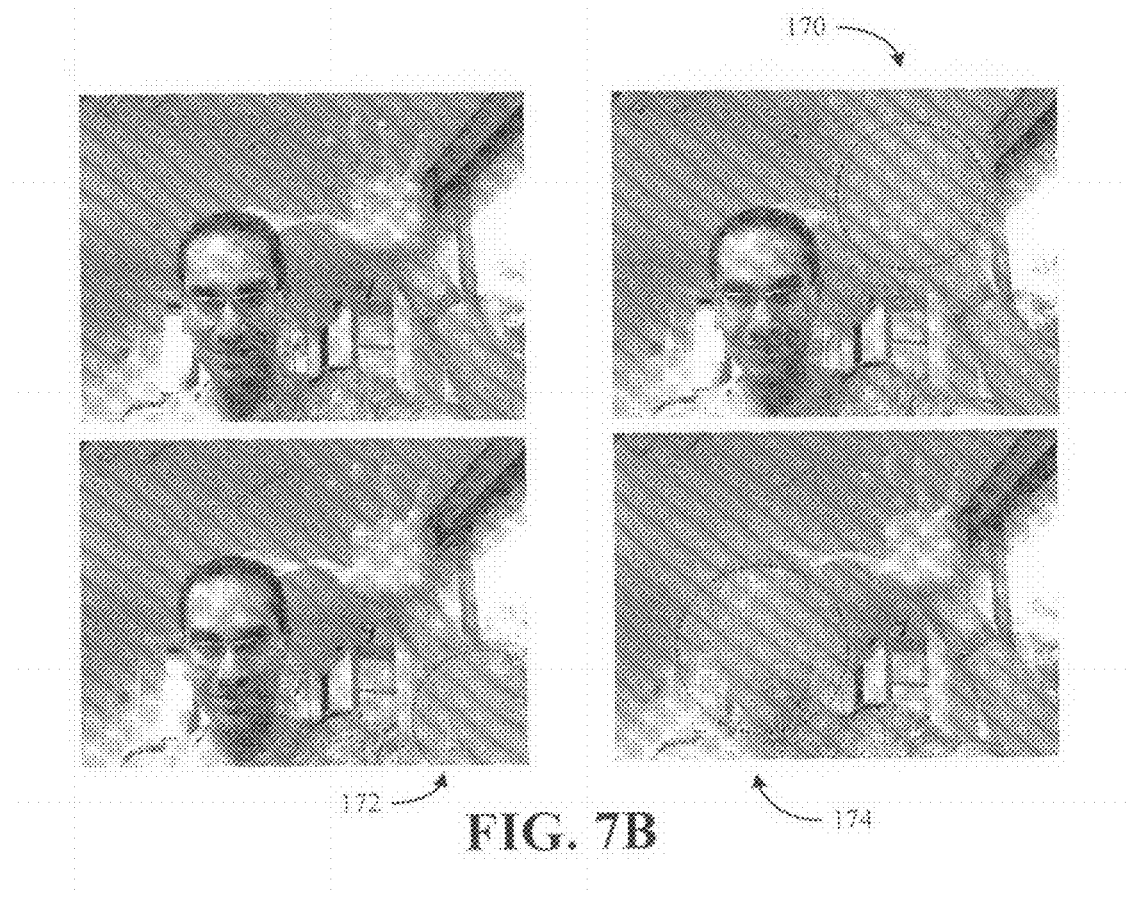
FIG. 7B is an illustration of an example of a set of images overlaid with blob cluster information according to an embodiment.

In addition, the properties of the clusters may be passed into an objective function that returns the optimal number of clusters and optimal clusters characterizing the input frame. In one example, the objective function returns all clusters that are compact (e.g., each cluster contains blobs having at least one neighbor in the same cluster) and disjoint from one another (e.g., different clusters do not contain neighboring blobs). In another example, which may be less computationally intensive, the objective function may return the k value after which the average cluster radius does not drop below a specific threshold (e.g., 75%). Thus, the objective function may identify clusters that satisfy one or more of a compactness condition, a disjointedness condition, or a size threshold condition. As best seen in FIG. 7B, the clustering process may provide for distinguishing between a hand cluster 172, an arm cluster 172 and a face cluster 174 in an image.

A density map may be formed at block 166, wherein block 168 may provide for using the density map to identify the one or more poses. In this regard, the location and size of each blob in each cluster may be normalized with respect to the cluster radius as computed in the k-means clustering process. Both values may be further scaled-up, in order to match the size (e.g., width and/or height) of the density map. Furthermore, for each block and scaled-up size, a 2D array of "0" and "1" values may be selected. In this array, the elements equal to "1" may form the shape of a filled circle of size equal to the scaled-up blob size. The array may then be multiplied with a weight (e.g., the inverse of the blob radius times a constant to provide a bias towards smaller blobs that are less likely to be found in the palm complex) and added to the current density map, at a location that corresponds to the blob's scaled x-y coordinates. The values of the density map may be further normalized and scaled-up so that they range between zero and a specific upper value. For example, if the upper value is 255, density maps may be represented using byte grids. Thus, block 166 may provide for normalizing one or more of the blobs with respect to a cluster radius, scaling up one or more of the blobs based on a size of the density map, and normalizing the density map to obtain a byte grid.

Figure 7C:
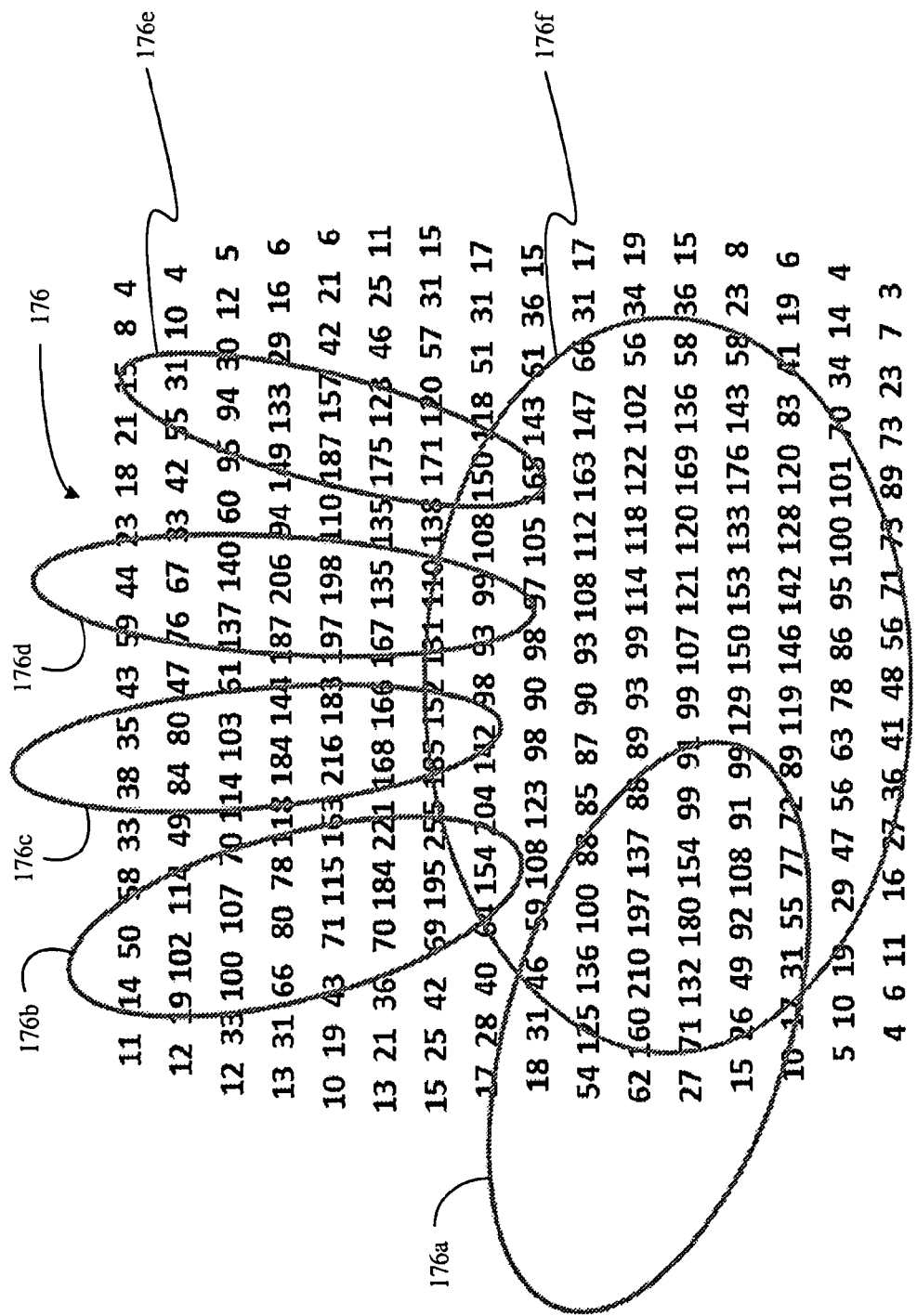
FIG. 7C is an illustration of an example of a density map according to an embodiment.

As best seen in FIG. 7C, the density map may generally have higher value regions 176 (176a-176f) that correspond to specific fingers of the hand. In the illustrated example, a thumb region 176a corresponds to the thumb, an index region 176b corresponds to the index finger, a middle region 176c corresponds to the middle finger, a ring region 176d corresponds to the ring finger, a pinky region 176e corresponds to the pinky finger, and a palm region 176f corresponds to the palm.

The identification of one or more poses at block 168 based on the density map may generally involve conducting one or more distance calculations. For example, the distances between an input density map and the pose descriptors of a database may be computed, wherein the computation returns the M best matches. In one example, the distance used is the Manhattan distance, also called an "L1" distance.

Thus, the pose unit 24b may include cluster logic 178 to group a plurality of blobs into a plurality of clusters, descriptor logic 180 to form a density map based on the plurality of clusters, and match logic 182 to use the density map to identify one or more poses. The cluster logic 178 may also weight the plurality of blobs according to blob size, wherein the plurality of clusters are k-means clusters. In one example, the cluster logic 178 includes an objective function 184 to identify clusters that satisfy one or more of a compactness condition, a disjointedness condition, or a size threshold condition. Moreover, the descriptor logic may normalize one or more of the blobs, scale-up one or more of the blobs and normalize the density map. Additionally, the match logic may conduct one or more distance calculation operations to identify the one or more poses.

Of particular note is that using the abstraction of blobs rather than pixels may significantly reduce complexity with regard to hand pose matching. Indeed, the number of blobs may be substantially fewer than the number of pixels in a given application (e.g., tens to hundreds versus tens of thousands). Accordingly, the blobs described herein may be processed at a relatively high rate.

Online Temporal Recognition

The online module 24 may also have a temporal recognition unit 24c to identify a plurality of observation trajectories for one or more poses, maintain scores for the plurality of observation trajectories simultaneously, and use the scores to conduct one or more blob-based hand gesture determinations. A trajectory may be defined as a sequence of transitions between a plurality of states of a Hidden Markov Model (HMM) where the states of the Hidden Markov Model may be associated with a plurality of observations via a plurality of discrete probability values or a continuous probability density function, typically modeled as Gaussian Mixture Model (GMM). In general, observations may be 8-dimensional determinations that encompass movement in the x-y-z domain (location and velocity), hand pose description, and duration, as shown below in Table I.

TABLE I

| 8-tuple |
|---|
| Location x |
| Location y |
| Location z |
| Velocity x |
| Velocity y |
| Velocity z |
| Pose ID |
| Duration |

Z-values may be estimated from the size of hand clusters returned from earlier stages of the gesture recognition pipeline. Moreover, pose identifiers may be determined from density maps created earlier in the pipeline. The simultaneous maintenance of scores for the observation trajectories may use a Hidden Markov Model created using an approach such as Baum-Welch. The Hidden Markov Model may arbitrarily partition the observations into streams, where each stream may be characterized by a district or continuous (Gaussian Mixture Model/GMM-based) probability distribution function.

With continuing reference to FIGS. 2 and 8A-8D, a method 186 of using Viterbi scores to conduct blob-based hand gesture determinations is shown. Illustrated blocks 188, 190, 192, 194, 196 and 210 may generally be executed once during a gesture system initialization phase. Illustrated block 212, on the other hand, may be executed multiple times, on a video frame-by-video frame basis. Illustrated block 188 identifies a set of valid transitions between observation states. The set of valid transitions may be identified in a gesture specification that specifies loose bounds that describe gesture movements while user input determines normal or acceptable gesture execution. For example, considering a hand waving gesture, a gesture designer might specify two states: a "left" state and a "right" state. The left state may include movement of the palm from left to right and the right state may include movement in the opposite direction. In such a case, the gesture designer might not specify the exact pixel positions in the screen where the palm is to be located as such a constraint may be too restrictive.

Thus, the gesture specification may include a set of specification states (e.g., spec_states), a set of valid transitions between the specification states, and a set of value intervals for each of the 8-dimensions for each of the specification states. The specification states may therefore reflect the gesture designer's notion of what the states of the gesture should be. The specification states may not be the final Hidden Markov Model (HMM) states used in making final gesture determinations, as will be discussed in greater detail. A state from the gesture specification may encompass one or more final HMM states.

Figure 8A:
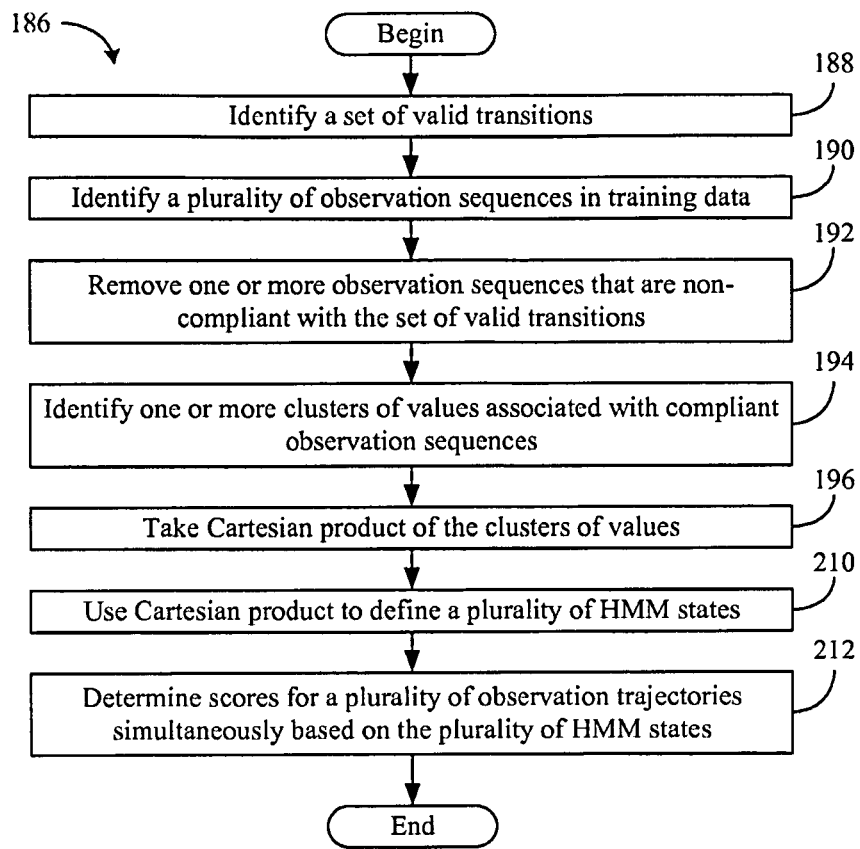
FIG. 8A is a flowchart of an example of a method of using Viterbi scores to conduct blob-based hand gesture determinations according to an embodiment.
Figure 8B:
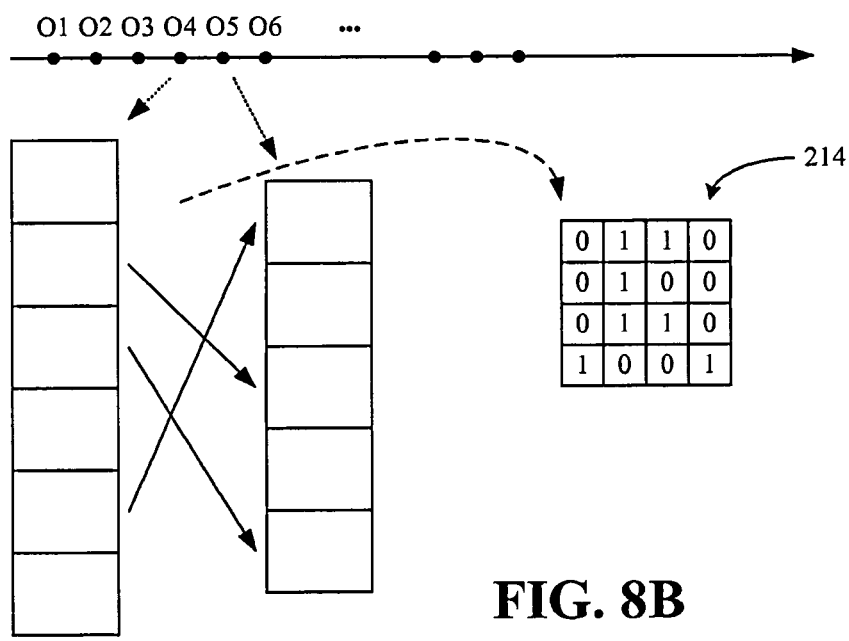
FIG. 8B is a block diagram of an example of an observation trajectory according to an embodiment.

Block 190 may provide for identifying a plurality of observation sequences in training data, wherein illustrated block 192 removes one or more observation sequences that are non-compliant with the set of valid transitions. Thus, a training data compliance system may be used to examine each observation sequence from a set of training data, computing for every pair of successive observations in the sequence the set of valid specification states that may be associated with these two observations. A pair of successive observation values may be compliant if at least one pair of valid specification states associated with the two values is specified in the gesture specification as a valid state transition. If all pairs of successive observation values in an observation sequence are compliant, then the observation sequence may be deemed to be compliant. As best seen in FIG. 8B, a transition between a pair of observation values (e.g., O4 to O5) may be valid if at least one transition from a "before" specification state to an "after" specification state is valid as reflected in a transition matrix 214.

Figure 8C:
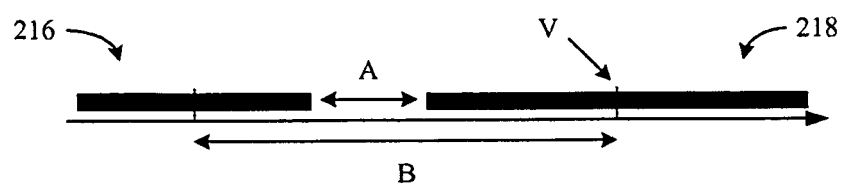
FIG. 8C is a block diagram of an example of a value clustering approach according to an embodiment.

Illustrated block 194 identifies one or more clusters of values associated with compliant observation sequences, wherein a Cartesian product of the clusters of values may be taken at block 196. The creation of clusters of values may be conducted via k-means clustering. In this regard, for each number of k clusters, a clustering scheme score may be determined, wherein the best k is the one for which clusters are most distant and similar in size. FIG. 8C demonstrates that the best number of clusters may be determined by computing a clustering score according to expressions such as the following.

$$\text{variance} = V/V\text{max}$$

$$\text{gap} = A/B$$

$$\text{score} = (0.5*Av. \text{Variance} + 0.5*\text{Min Variance})*(0.5*Av. \text{Gap} + 0.5*\text{Min Gap})$$

Figure 8D:
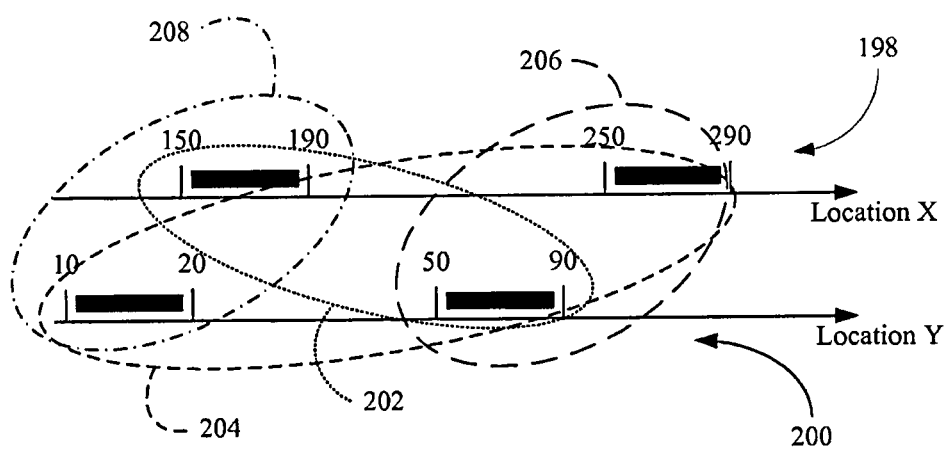
FIG. 8D is a block diagram of an example of a Cartesian product approach according to an embodiment.

As best shown in FIG. 8D, the Cartesian product may be taken between a pair of x-axis values 198 and a pair of y-axis values 200 to obtain states 202, 204, 206 and 208. The Cartesian product results may be used at block 210 to define a plurality of HMM states. From this plurality of HMM states, states that are not compliant with the gesture specification may be removed from the set of HMM states. In addition to the Cartesian product results, the HMM states may include states that are included in the gesture specification and not represented in any cross product combination coming from training data. The HMM may also have probability distribution tables that are initialized using the greater regions specified by the gesture designer in the specification states for table lookup values. Moreover, for those state elements that use Gaussian Mixture Models (GMMs), the HMM may begin with mixtures at the values specified in the earlier-identified clusters. Additionally, frequency counting may be used for computing initial state probabilities and state transition probabilities.

Illustrated block 212 determines scores for a plurality of observation trajectories based on the plurality of HMM states. In one example, the scores are Viterbi scores that denote the likelihood that some given observation sequence describes a real gesture. As already noted, the gesture may be modeled by an HMM, wherein the HMM may be associated with the execution of a Viterbi module. If time warping is not implemented (e.g., due to a lack of knowledge about when a gesture begins and ends), scores about multiple observation trajectories may be maintained simultaneously. More particularly, Viterbi scores may monotonically decrease as a function of time. Accordingly, depending on how the Viterbi scores drop, the blob-based hand gesture determinations may distinguish between ongoing gestures (e.g., score drops are in an acceptable range), "killed" trajectories (e.g., score drops below an acceptable range) and completed gestures (e.g., score drops below an acceptable range but one or more gesture completion conditions are satisfied). Gesture completion conditions may include reaching a terminal state in an HMM system or maintaining a "good" Viterbi score for a minimum duration of time. HMM states may be characterized as terminal states if the probability that the HMM system remains in these states is higher than a specific constant.

Training data may therefore be used to develop a probabilistic model that captures the most common ways to perform gestures such as the hand waiving gesture discussed above. For example, some movement from left to right and back that would not typically qualify as hand waiving (e.g., moving only the index finger left to right and back close to the floor) may pass the training data compliance test but fail to acquire a high Viterbi score due to the fact that there would likely be few or no representatives of this movement in the training data. Accordingly, unusual movement may not be mistaken for hand waiving.

If space warping is not implemented (e.g., due to a lack of knowledge of when a gesture begins and ends), relatively large data sets may be used to capture the various ways that a specific gesture may be performed in a given application. For example, different users may move their hands in different parts of the screen, with different velocities, or perform a specific movement (e.g., thumbs up) in subtly different ways. By using large training data sets and by capturing the amount and properties of such different, the illustrated approach may increase the likelihood of successful recognition. Moreover, the various hand locations, poses and velocities associated with a gesture may be used to create multiple and distinct HMM states. Accordingly, the palm trajectory of one user may be modeled as a separate state sequence from the palm trajectory of another user. Such an approach may further enhance accuracy without encountering space warping. Since training may take place offline and once, using larger data sets may not burden online performance.

Thus, the temporal recognition unit 24c may include specification logic 220 to identify a set of valid transitions and compliance logic 222 to identify a plurality of observation sequences in training data and remove one or more observation sequences that are non-compliant with the set of valid transitions. HMM initialization logic 224 may identify one or more clusters of values associated with compliant observation sequences, take a Cartesian product of the one or more clusters of values and use the Cartesian product to define a plurality of HMM states. Additionally, the temporal recognition unit 24c may include Viterbi logic 226 that determines scores for a plurality of observation trajectories based on the plurality of HMM states. In one example, blob-based hand gesture determinations are conducted based on drops in the scores, wherein the blob-based hand gesture determinations distinguish between ongoing trajectories, killed trajectories and completed trajectories. Completed trajectories may be associated with completed gestures, satisfying a plurality of gesture completion conditions.

One or more of the method described herein may be implemented in a computing device as a set of logic instructions and/or firmware stored in a machine- or computer-readable medium such as random access memory (RAM), read only memory (ROM), programmable ROM (PROM), flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in the methods may be written in any combination of one or more programming languages, including an object oriented programming language such as C++ or the like and conventional procedural programming languages, such as the "C" programming language or similar programming languages. Moreover, the methods may be implemented using any of the aforementioned circuit technologies.

Figure 9:
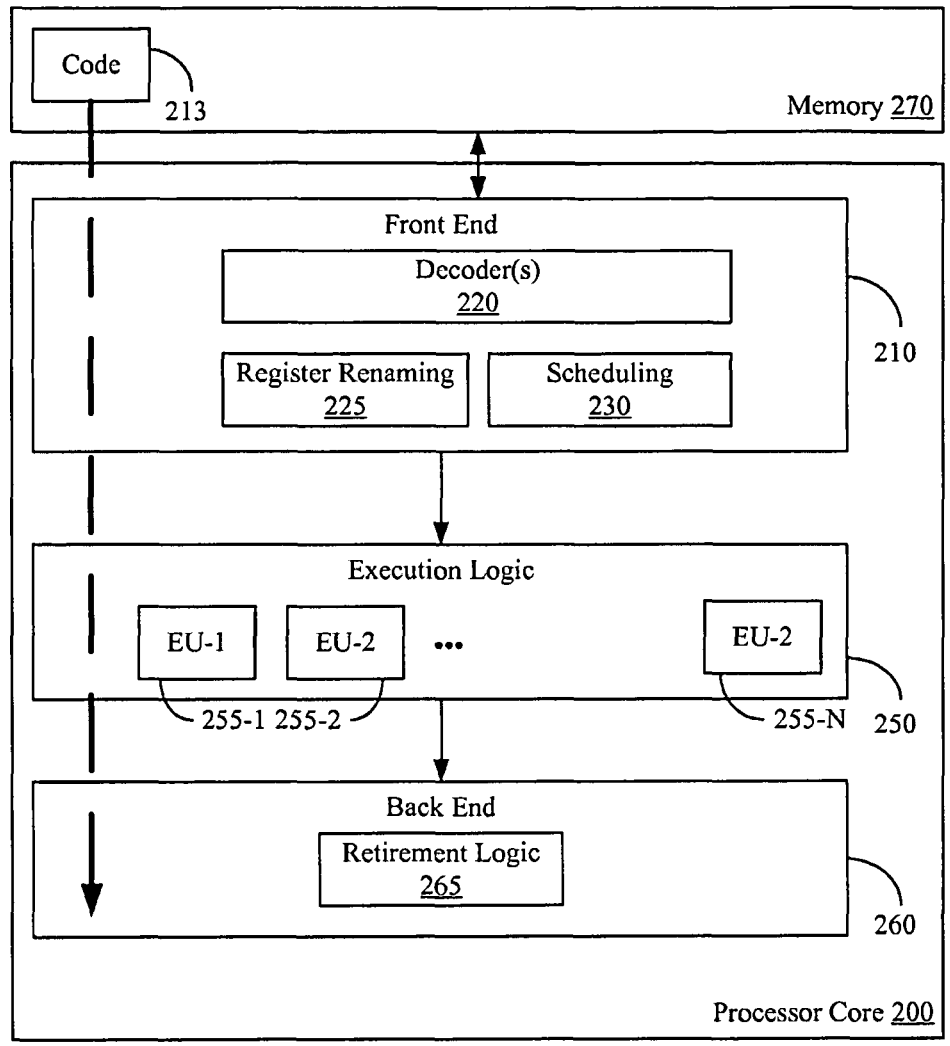
FIG. 9 is a block diagram of an example of a processor according to an embodiment.

FIG. 9 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 9, a processing element may alternatively include more than one of the processor core 200 illustrated in FIG. 9. The processor core 200 may be a single-threaded core or, for at least one embodiment, the processor core 200 may be multithreaded in that it may include more than one hardware thread context (or "logical processor") per core.

FIG. 9 also illustrates a memory 270 coupled to the processor 200. The memory 270 may be any of a wide variety of memories (including various layers of memory hierarchy) as are known or otherwise available to those of skill in the art. The memory 270 may include one or more code 213 instruction(s) to be executed by the processor 200 core, wherein the code 213 may implement one or more of the methods described herein. The memory 270 may further include input video frames, state variables and constants associated with the execution of the blocks of the gesture detection pipeline. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, micro-instructions, or control signals which reflect the original code instruction. The illustrated front end 210 also includes register renaming logic 225 and scheduling logic 230, which generally allocate resources and queue the operation corresponding to the convert instruction for execution.

The processor 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 9, a processing element may include other elements on chip with the processor core 200. For example, a processing element may include memory control logic along with the processor core 200. The processing element may include I/O control logic and/or may include I/O control logic integrated with memory control logic. The processing element may also include one or more caches and attached image sensors.

Figure 10:
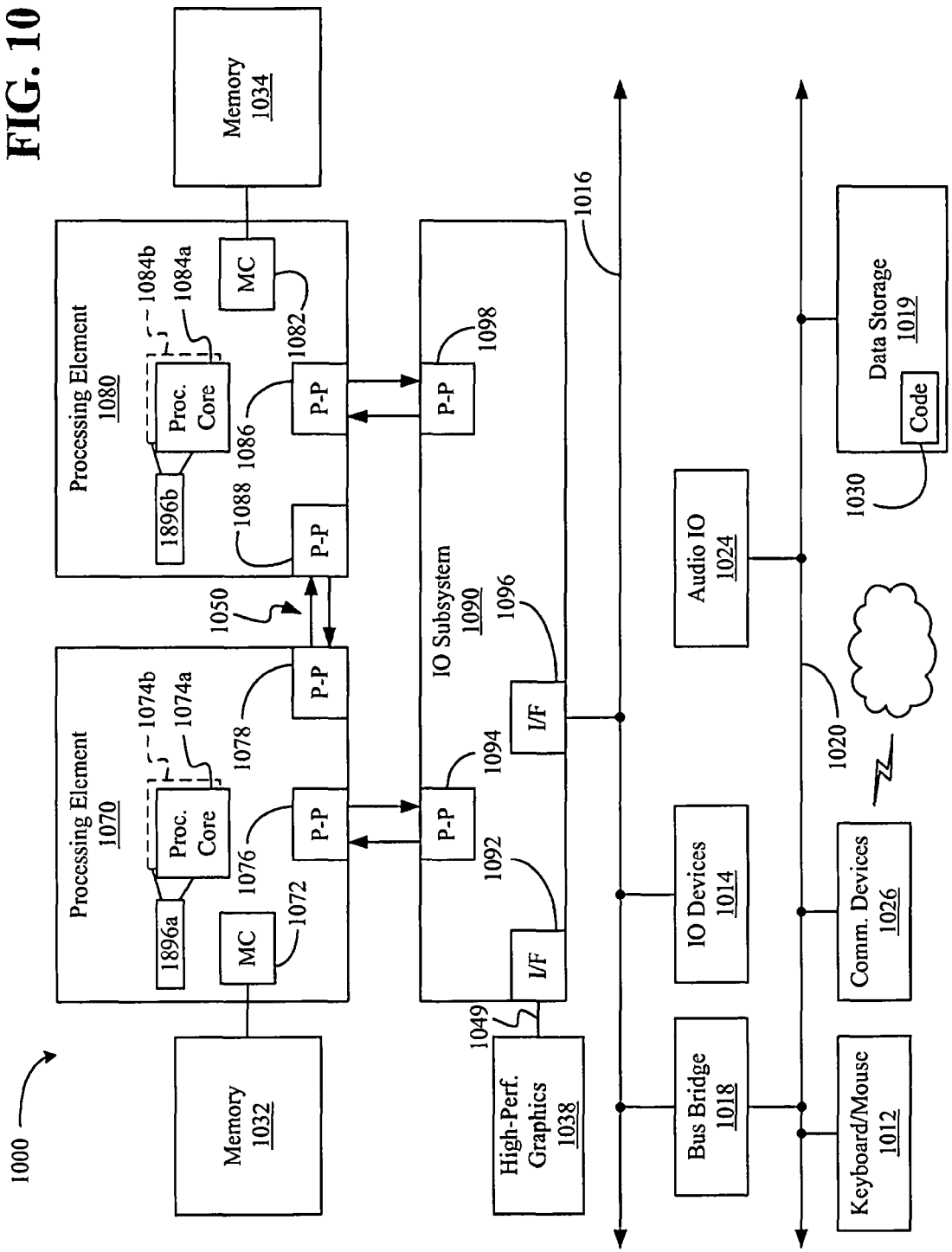
FIG. 10 is a block diagram of an example of a system according to an embodiment.

Referring now to FIG. 10, shown is a block diagram of a system 1000 embodiment in accordance with an embodiment. Shown in FIG. 10 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 10 may be implemented as a multi-drop bus rather than point-to-point interconnect.

As shown in FIG. 10, each of processing elements 1070 and 1080 may be multicore processors, including first and second processor cores (i.e., processor cores 1074a and 1074b and processor cores 1084a and 1084b). Such cores 1074, 1074b, 1084a, 1084b may be configured to execute instruction code in a manner similar to that discussed above in connection with FIG. 9.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 10, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 10, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 10, various I/O devices 1014 (e.g., cameras) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, network controllers/communication device(s) 1026 (which may in turn be in communication with a computer network), and a data storage unit 1019 such as a disk drive or other mass storage device which may include code 1030, in one embodiment. The code 1030 may include instructions for performing embodiments of one or more of the methods described above. Thus, the illustrated code 1030 may implement one or more of the methods described herein, and may be similar to the code 213 (FIG. 9), already discussed. Further, an audio I/O 1024 may be coupled to second bus 1020, wherein the audio I/O 1024 may be used to establish a headset connection.

Note that other embodiments are contemplated. For example, instead of the point-to-point architecture of FIG. 10, a system may implement a multi-drop bus or another such communication topology. Also, the elements of FIG. 10 may alternatively be partitioned using more or fewer integrated chips than shown in FIG. 10.

ADDITIONAL NOTES AND EXAMPLES

Example 1 may include an apparatus to recognize hand gestures, having an offline module to determine a skin tone distribution for a plurality of pixels in a video signal. The apparatus may also have an offline module to use the skin tone distribution to conduct one or more blob-based hand gesture determinations with respect to the video signal.

Example 2 may include the apparatus of example 1, wherein the video signal is to include two-dimensional (2D) image data.

Example 3 may include the apparatus of example 1, wherein the skin tone distribution is to have an execution time budget that is greater than an execution time budget of the blob-based hand gesture determinations.

Example 4 may include the apparatus of any one of examples 1 to 3, wherein the offline module includes an edge detection unit to receive a color image associated with a frame of the video signal and conduct an edge analysis on the color image for each of a plurality of channels.

Example 5 may include the apparatus of example 4, wherein the edge detection unit includes box logic to, for each channel in the plurality of channels, determine a set of Gaussian derivatives, convolution logic to perform a convolution between the set of Gaussian derivatives and each pixel in the color image to obtain a gradient magnitude and a gradient angle for each pixel in the color image on a per channel basis, and threshold logic to use a low threshold and a high threshold to determine whether each gradient magnitude and associated gradient angle corresponds to an edge, wherein the low threshold and the high threshold are channel-specific.

Example 6 may include the apparatus of example 5, wherein the threshold logic is to, for each channel in the plurality of channels, build a histogram of gradient magnitudes and determine the low threshold and the high threshold based on the histogram.

Example 7 may include the apparatus of example 5, wherein the edge detection unit further includes stack logic to identify one or more edge pixels and determine whether a neighborhood of pixels around the one or more edge pixels includes additional edge pixels, wherein the neighborhood of pixels is to include one or more pixels that are non-adjacent to the one or more edge pixels.

Example 8 may include the apparatus of example 5, wherein the box logic is to set a variance parameter of the set of Gaussian derivatives to a value greater than one.

Example 9 may include the apparatus of example 4, wherein the offline module further includes a distance unit to identify an edge map associated with the edge analysis and iteratively propagate nearest neighbor information between pixels in the edge map to obtain a distance map.

Example 10 may include the apparatus of example 9, wherein the distance module includes first initialization logic to initialize edge pixels in the edge map as being their own nearest edges and having an edge distance of zero, add the initialized edge pixels to a first queue, and designate the first queue as an active queue, second initialization logic to initialize non-edge pixels in the edge map as having unknown nearest edges and an edge distance of infinity and designate a second queue as an inactive queue, comparison logic to, for each pixel in the active queue, conduct a distance determination as to whether a first distance between a neighboring pixel and a nearest edge of the pixel in the active queue is less than or equal to a second distance between the neighboring pixel and a current nearest edge of the neighboring pixel, broadcast logic to conduct a transfer of a state of the pixel in the active queue to a state of the neighboring pixel if the first distance is less than or equal to the second distance, and replace the second distance in the state of the neighboring pixel with the first distance, queue logic to conduct a removal the pixel in the active queue from the active queue and an addition of the neighboring pixel to the inactive queue if the first distance is less than or equal to the second distance, first iteration logic to repeat a first invocation of the comparison logic, the broadcast logic and the queue logic for each neighboring pixel of the pixel in the active queue, and second iteration logic to conduct a first designation of the first queue as the inactive queue, a second designation of the second queue as the active queue, and repeat a subsequent invocation of the comparison logic, the broadcast logic, the queue logic and the first iteration logic until the active queue is empty.

Example 11 may include the apparatus of example 9, wherein the offline module further includes a fingertip unit to identify a set of contour line pixels that surround a plurality of fingertips in the color image based on the edge map and the distance map.

Example 12 may include the apparatus of example 11, wherein the fingertip module includes, local logic to use a set of finger segment curves to identify a plurality of local edge distance minima corresponding to the plurality of fingertips, wherein the plurality of fingertips includes one or more of an index fingertip, a middle fingertip, a ring fingertip, or a pinky fingertip, and global logic to use the set of finger segment curves to identify four global edge distance minima for contour line pixels associated with each local edge distance minimum and with each of the plurality of fingertips.

Example 13 may include the apparatus of example 12, wherein the set of finger segment curves is to include a concatenation of two line segments and two ellipse segments.

Example 14 may include the apparatus of example 11, wherein the skin tone distribution is to be determined based on color values for pixels inside the set of contour line pixels.

Example 15 may include the apparatus of any one of examples 1 to 3, wherein the online module is to remove non-skin pixels from an input frame associated with the video signal based on the skin tone distribution and sub-sample the input frame to obtain a plurality of modified frames, and wherein the online module includes a feature extraction unit to identify a plurality of blobs in the plurality of modified frames.

Example 16 may include the apparatus of example 15, wherein the feature extraction unit includes trace logic to determine a Hessian trace function, convolution logic to, for each pixel in a modified frame, perform a convolution between the Hessian trace function and a set of non-adjacent pixels associated with the pixel in the modified frame to obtain a convolution score, scale logic to invoke the convolution logic for a plurality of variance parameter values to obtain a plurality of convolution scores for the pixel in the modified frame, and selection logic to identify a blob corresponding to a highest score in the plurality of convolution scores.

Example 17 may include the apparatus of example 16, wherein the convolution logic is to use a 9×9 convolution box to perform the convolution.

Example 18 may include the apparatus of example 16, wherein the set of non-adjacent pixels are to have a spacing of a closest integer to three quarters the variance parameter of the Hessian trace function.

Example 19 may include the apparatus of example 16, wherein one or more variance parameter values in the plurality of variance parameter values is to be a one quarter increment of a preceding variance parameter value.

Example 20 may include the apparatus of example 16, wherein the convolution logic is to use one or more single instruction multiple data (SIMD) commands and a SIMD convolution method to perform the convolution.

Example 21 may include the apparatus of example 15, wherein the online module further includes a pose unit to match one or more poses associated with the plurality of blobs to one or more poses stored in a library.

Example 22 may include the apparatus of example 21, wherein the pose unit includes cluster logic to group the plurality of blobs into a plurality of clusters, descriptor logic to form a density map based on the plurality of clusters, and match logic to use the density map to identify the one or more poses.

Example 23 may include the apparatus of example 22, wherein the cluster logic is to weight the plurality of blobs according to blob size, and wherein the plurality of clusters are to be k-means clusters.

Example 24 may include the apparatus of example 22, wherein the cluster logic is to use an objective function to identify clusters that satisfy one or more of a compactness condition, a disjointedness condition, or a size threshold condition.

Example 25 may include the apparatus of example 22, wherein the descriptor logic is to normalize one or more of the blobs with respect to a cluster radius, scale-up one or more of the blobs based on a size of the density map and normalize the density map to obtain a byte grid.

Example 26 may include the apparatus of example 22, wherein the match logic is to conduct one or more distance calculation operations to identify the one or more poses.

Example 27 may include the apparatus of example 21, wherein the online module further includes a temporal recognition unit to identify a plurality of observation trajectories for the one or more poses, maintain scores for the plurality of observation trajectories simultaneously, and use the scores to conduct the one or more blob-based hand gesture determinations.

Example 28 may include the apparatus of example 27, wherein the temporal recognition unit includes specification logic to identify a set of valid transitions, compliance logic to identify a plurality of observation sequences in training data and remove one or more observation sequences that are non-compliant with the set of valid transitions, Hidden Markov Model (HMM) initialization logic to identify one or more clusters of values associated with compliant observation sequences, take a Cartesian product of the one or more clusters of values and use the Cartesian product to define a plurality of HMM states, and Viterbi logic to determine the scores for the plurality of observation trajectories based on the plurality of HMM states, wherein the blob-based hand gesture determinations are to distinguish between ongoing trajectories, killed trajectories and completed trajectories based on drops in the scores.

Example 29 may include an apparatus of recognizing hand gestures. The method may include determining a skin tone distribution for a plurality of pixels in a video signal and using the skin tone distribution to conduct one or more blob-based hand gesture determinations with respect to the video signal.

Example 30 may include the method of example 29, wherein the video signal includes two-dimensional (2D) image data.

Example 31 may include the method of example 29, wherein the skin tone distribution has an execution time budget that is greater than an execution time budget of the blob-based hand gesture determinations.

Example 32 may include the method of any one of examples 29 to 31, further including, receiving a color image associated with a frame of the video signal, and conducting an edge analysis on the color image for each of a plurality of channels.

Example 33 may include the method of example 32, further including determining, for each channel in the plurality of channels, a set of Gaussian derivatives, performing a convolution between the set of Gaussian derivatives and each pixel in the color image to obtain a gradient magnitude and a gradient angle for each pixel in the color image on a per channel basis, and using a low threshold and a high threshold to determine whether each gradient magnitude and associated gradient angle corresponds to an edge, wherein the low threshold and the high threshold are channel-specific.

Example 34 may include the method of example 33, further including building, for each channel in the plurality of channels, a histogram of gradient magnitudes, and determining the low threshold and the high threshold based on the histogram.

Example 35 may include the method of example 33, further including identifying one or more edge pixels, and determining whether a neighborhood of pixels around the one or more edge pixels includes additional edge pixels, wherein the neighborhood of pixels includes one or more pixels that are non-adjacent to the one or more edge pixels.

Example 36 may include the method of example 33, further including setting a variance parameter of the set of Gaussian derivatives to a value greater than one.

Example 37 may include the method of example 32, further including identifying an edge map associated with the edge analysis, and iteratively propagating nearest neighbor information between pixels in the edge map to obtain a distance map.

Example 38 may include the method of example 37, further including, initializing edge pixels in the edge map as being their own nearest edges and having an edge distance of zero, adding the initialized edge pixels to a first queue, designating the first queue as an active queue, initializing non-edge pixels in the edge map as having unknown nearest edges and an edge distance of infinity, designating a second queue as an inactive queue, conducting, for each pixel in the active queue, a distance determination as to whether a first distance between a neighboring pixel and a nearest edge of the pixel in the active queue is less than or equal to a second distance between the neighboring pixel and a current nearest edge of the neighboring pixel, conducting a transfer of a state of the pixel in the active queue to a state of the neighboring pixel if the first distance is less than or equal to the second distance, replacing the second distance in the state of the neighboring pixel with the first distance, conducting a removal of the pixel in the active queue from the active queue, conducting an addition of the neighboring pixel to the inactive queue if the first distance is less than or equal the second distance, conducting a first repeat of the distance determination, the transfer of the state and the addition of the neighboring pixel for each neighboring pixel of the pixel in the active queue, conducting a first designation of the first queue as the inactive queue, conducting a second designation of the second queue as the active queue, and conducting a subsequent repeat of the first repeat, the first designation and the second designation until the active queue is empty.

Example 39 may include the method of example 37, further including identifying a set of contour line pixels that surround a plurality of fingertips in the color image based on the edge map and the distance map.

Example 40 may include the method of example 39, further including using a set of finger segment curves to identify a plurality of local edge distance minima corresponding to the plurality of fingertips, wherein the plurality of fingertips includes one or more of an index fingertip, a middle fingertip, a ring fingertip, or a pinky fingertip, and using the set of finger segment curves to identify four global edge distance minima for contour line pixels associated with each local edge distance minimum, and with the plurality of fingertips.

Example 41 may include the method of example 40, wherein the set of finger segment curves includes a concatenation of two line segments and two ellipse segments.

Example 42 may include the method of example 39, wherein the skin tone distribution is determined based on color values for pixels inside the set of contour line pixels.

Example 43 may include the method of any one of examples 29 to 31, further including removing non-skin pixels from an input frame associated with the video signal based on the skin tone distribution, sub-sampling the input frame to obtain a plurality of modified frames, and identifying a plurality of blobs in the plurality of modified frames.

Example 44 may include the method of example 43, further including determining a Hessian trace function, performing, for each pixel in a modified frame, a convolution between the Hessian trace function and a set of non-adjacent pixels associated with the pixel in the modified frame to obtain a convolution score, invoking the convolution for a plurality of variance parameter values to obtain a plurality of convolution scores for the pixel in the modified frame, and identifying a blob corresponding to a highest score in the plurality of convolution scores.

Example 45 may include the method of example 44, further including using a 9×9 convolution box to perform the convolution.

Example 46 may include the method of example 44, wherein the set of non-adjacent pixels have a spacing of a closest integer to three quarters the variance parameter of the Hessian trace function.

Example 47 may include the method of example 44, wherein one or more variance parameter values in the plurality of variance parameter values is a one quarter increment of a preceding variance parameter value.

Example 48 may include the method of example 44, further including using one or more single instruction multiple data (SIMD) commands and a SIMD convolution method to perform the convolution.

Example 49 may include the method of example 43, further including matching one or more poses associated with the plurality of blobs to one or more poses stored in a library.

Example 50 may include the method of example 49, further including grouping the plurality of blobs into a plurality of clusters, forming a density map based on the plurality of clusters, and using the density map to identify the one or more poses.

Example 51 may include the method of example 50, further including weighting the plurality of blobs according to blob size, wherein the plurality of clusters are k-means clusters.

Example 52 may include the method of example 50, further including using an objective function to identify clusters that satisfy one or more of a compactness condition, a disjointedness condition, or a size threshold condition.

Example 53 may include the method of example 50, further including normalizing one or more of the blobs with respect to a cluster radius, scaling up one or more of the blobs based on a size of the density map, and normalizing the density map to obtain a byte grid.

Example 54 may include the method of example 50, further including conducting one or more distance calculation operations to identify the one or more poses.

Example 55 may include the method of example 49, further including identifying a plurality of observation trajectories for the one or more poses, maintaining scores for the plurality of observation trajectories simultaneously, and using the scores to conduct the one or more blob-based hand gesture determinations.

Example 56 may include the method of example 55, further including identifying a set of valid transitions, identifying a plurality of observation sequences in training data, removing one or more observation sequences that are non-compliant with the set of valid transitions, identifying one or more clusters of values associated with compliant observation sequences, taking a Cartesian product of the one or more clusters of values, using the Cartesian product to define a plurality of Hidden Markov Model (HMM) states, and determining the scores for the plurality of observation trajectories based on the plurality of HMM states, wherein the blob-based hand gesture determinations distinguish between ongoing trajectories, killed trajectories and completed trajectories based on drops in the scores.

Example 57 may include at least one computer readable storage medium having a set of instructions which, if executed by a computing device, cause the computing device to perform the method of any one of examples 29 to 56.

Example 58 may include an apparatus to recognize hand gestures, having means for performing the method of any one of examples 29 to 56.

Techniques described herein may therefore spit computations using pixels offline for accuracy and Gaussian blobs online for efficiency. In addition, the variant of iterative closest point matching may be used, where curves such as line and ellipse segments surround only the fingertips. Moreover, feature extraction may be a sequence of blob detection states, where the blobs selected are not only the local scale space maxima but all maxima in a subset of the pixels identified by the previous stage. Additionally, pose descriptors may be created from blobs using density maps, which may reduce the pose classification process to computing a number of distances between vectors.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size may be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An apparatus to recognize hand gestures, comprising:
an offline module to determine a skin tone distribution for a plurality of pixels in a video signal, wherein the offline module includes an edge detection unit to receive a color image associated with a frame of the video signal and conduct an edge analysis on the color image for each of a plurality of channels and wherein the edge detection unit includes:
box logic to, for each channel in the plurality of channels, determine a set of Gaussian derivatives;
convolution logic to perform a convolution between the set of Gaussian derivatives and each pixel in the color image to obtain a gradient magnitude and a gradient angle for each pixel in the color image on a per channel basis; and
threshold logic to use a low threshold and a high threshold to determine whether each gradient magnitude and associated gradient angle corresponds to an edge, wherein the low threshold and the high threshold are channel-specific; and
an online module to use the skin tone distribution to conduct one or more blob-based hand gesture determinations with respect to the video signal.

2. The apparatus of claim 1, wherein the video signal is to include two-dimensional (2D) image data.

3. The apparatus of claim 1, wherein the skin tone distribution is to have an execution time budget that is greater than an execution time budget of the blob-based hand gesture determinations.

4. The apparatus of claim 1, wherein the threshold logic is to, for each channel in the plurality of channels, build a histogram of gradient magnitudes and determine the low threshold and the high threshold based on the histogram.

5. The apparatus of claim 1, wherein the edge detection unit further includes stack logic to identify one or more edge pixels and determine whether a neighborhood of pixels around the one or more edge pixels includes additional edge pixels, wherein the neighborhood of pixels is to include one or more pixels that are non-adjacent to the one or more edge pixels.

6. The apparatus of claim 1, wherein the box logic is to set a variance parameter of the set of Gaussian derivatives to a value greater than one.

7. The apparatus of claim 1, wherein the offline module further includes a distance unit to identify an edge map associated with the edge analysis and iteratively propagate nearest neighbor information between pixels in the edge map to obtain a distance map.

8. The apparatus of claim 7, wherein the offline module further includes a fingertip unit to identify a set of contour line pixels that surround a plurality of fingertips in the color image based on the edge map and the distance map.

9. The apparatus of claim 1, wherein the online module is to remove non-skin pixels from an input frame associated with the video signal based on the skin tone distribution and sub-sample the input frame to obtain a plurality of modified frames, and wherein the online module includes a feature extraction unit to identify a plurality of blobs in the plurality of modified frames.

10. The apparatus of claim 9, wherein the online module further includes a pose unit to match one or more poses associated with the plurality of blobs to one or more poses stored in a library.

11. The apparatus of claim 10, wherein the online module further includes a temporal recognition unit to identify a plurality of observation trajectories for the one or more poses, maintain scores for the plurality of observation trajectories simultaneously, and use the scores to conduct the one or more blob-based hand gesture determinations.

12. An apparatus to recognize hand gestures, comprising:

an offline module to determine a skin tone distribution for a plurality of pixels in a video signal, wherein the offline module includes an edge detection unit to receive a color image associated with a frame of the video signal and conduct an edge analysis on the color image for each of a plurality of channels and further includes a distance unit to identify an edge map associated with the edge analysis and iteratively propagate nearest neighbor information between pixels in the edge map to obtain a distance map; and an online module to use the skin tone distribution to conduct one or more blob-based hand gesture determinations with respect to the video signal, wherein the distance unit includes:

first initialization logic to initialize edge pixels in the edge map as being their own nearest edges and having an edge distance of zero, add the initialized edge pixels to a first queue, and designate the first queue as an active queue;

second initialization logic to initialize non-edge pixels in the edge map as having unknown nearest edges and an edge distance of infinity and designate a second queue as an inactive queue;

comparison logic to, for each pixel in the active queue, conduct a distance determination as to whether a first distance between a neighboring pixel and a nearest edge of the pixel in the active queue is less than or equal to a second distance between the neighboring pixel and a current nearest edge of the neighboring pixel;

broadcast logic to conduct a transfer of a state of the pixel in the active queue to a state of the neighboring pixel if the first distance is less than or equal to the second distance, and replace the second distance in the state of the neighboring pixel with the first distance;

queue logic to conduct a removal the pixel in the active queue from the active queue and an addition of the neighboring pixel to the inactive queue if the first distance is less than or equal to the second distance;

first iteration logic to repeat a first invocation of the comparison logic, the broadcast logic and the queue logic for each neighboring pixel of the pixel in the active queue; and second iteration logic to conduct a first designation of the first queue as the inactive queue, a second designation of the second queue as the active queue, and repeat a subsequent invocation of the comparison logic, the broadcast logic, the queue logic and the first iteration logic until the active queue is empty.

13. An apparatus to recognize hand gestures, comprising:

an offline module to determine a skin tone distribution for a plurality of pixels in a video signal, wherein the offline module includes an edge detection unit to receive a color image associated with a frame of the video signal and conduct an edge analysis on the color image for each of a plurality of channels and further includes a distance unit to identify an edge map associated with the edge analysis and iteratively propagate nearest neighbor information between pixels in the edge map to obtain a distance map and further includes a fingertip unit to identify a set of contour line pixels that surround a plurality of fingertips in the color image based on the edge map and the distance map; and an online module to use the skin tone distribution to conduct one or more blob-based hand gesture determinations with respect to the video signal, wherein the fingertip unit includes:

local logic to use a set of finger segment curves to identify a plurality of local edge distance minima corresponding to the plurality of fingertips, wherein the plurality of fingertips includes one or more of an index fingertip, a middle fingertip, a ring fingertip, or a pinky fingertip; and global logic to use the set of finger segment curves to identify four global edge distance minima for contour line pixels associated with each local edge distance minimum and with each of the plurality of fingertips.

14. The apparatus of claim 13, wherein the set of finger segment curves is to include a concatenation of two line segments and two ellipse segments.

15. An apparatus to recognize hand gestures, comprising:

an offline module to determine a skin tone distribution for a plurality of pixels in a video signal, wherein the offline module includes an edge detection unit to receive a color image associated with a frame of the video signal and conduct an edge analysis on the color image for each of a plurality of channels and further includes a distance unit to identify an edge map associated with the edge analysis and iteratively propagate nearest neighbor information between pixels in the edge map to obtain a distance map and further includes a fingertip unit to identify a set of contour line pixels that surround a plurality of fingertips in the color image based on the edge map and the distance map; and an online module to use the skin tone distribution to conduct one or more blob-based hand gesture determinations with respect to the video signal, wherein the skin tone distribution is to be determined based on color values for pixels inside the set of contour line pixels.

16. An apparatus to recognize hand gestures, comprising:

an offline module to determine a skin tone distribution for a plurality of pixels in a video signal, wherein the offline module is to remove non-skin pixels from an input frame associated with the video signal based on the skin tone distribution and sub-sample the input frame to obtain a plurality of modified frames, and wherein the online module includes a feature extraction unit to identify a plurality of blobs in the plurality of modified frames; and an online module to use the skin tone distribution to conduct one or more blob-based hand gesture determinations with respect to the video signal, wherein the feature extraction unit includes:

trace logic to determine a Hessian trace function;

convolution logic to, for each pixel in a modified frame, perform a convolution between the Hessian trace function and a set of non-adjacent pixels associated with the pixel in the modified frame to obtain a convolution score;

scale logic to invoke the convolution logic for a plurality of variance parameter values to obtain a plurality of convolution scores for the pixel in the modified frame; and selection logic to identify a blob corresponding to a highest score in the plurality of convolution scores.

17. The apparatus of claim 16, wherein the convolution logic is to use a 9×9 convolution box to perform the convolution.

18. The apparatus of claim 16, wherein the set of non-adjacent pixels are to have a spacing of a closest integer to two thirds the variance parameter of the Hessian trace function.

19. The apparatus of claim 16, wherein one or more variance parameter values in the plurality of variance parameter values is to be a one quarter increment of a preceding variance parameter value.

20. The apparatus of claim 16, wherein the convolution logic is to use one or more single instruction multiple data (SIMD) commands and a SIMD convolution method to perform the convolution.

21. An apparatus to recognize hand gestures, comprising:
an offline module to determine a skin tone distribution for a plurality of pixels in a video signal; and
an online module to use the skin tone distribution to conduct one or more blob-based hand gesture determinations with respect to the video signal wherein the online module is to remove non-skin pixels from an input frame associated with the video signal based on the skin tone distribution and sub-sample the input frame to obtain a plurality of modified frames, and wherein the online module includes a feature extraction unit to identify a plurality of blobs in the plurality of modified frames and wherein the online module further includes a pose unit to match one or more poses associated with the plurality of blobs to one or more poses stored in a library, wherein the pose unit includes:
cluster logic to group the plurality of blobs into a plurality of clusters;
descriptor logic to form a density map based on the plurality of clusters; and
match logic to use the density map to identify the one or more poses.

22. The apparatus of claim 21, wherein the cluster logic is to weight the plurality of blobs according to blob size, and wherein the plurality of clusters are to be k-means clusters.

23. The apparatus of claim 21, wherein the cluster logic is to use an objective function to identify clusters that satisfy one or more of a compactness condition, a disjointedness condition, or a size threshold condition.

24. The apparatus of claim 21, wherein the descriptor logic is to normalize one or more of the blobs with respect to a cluster radius, scale-up one or more of the blobs based on a size of the density map and normalize the density map to obtain a byte grid.

25. The apparatus of claim 21, wherein the match logic is to conduct one or more distance calculation operations to identify the one or more poses.

26. An apparatus to recognize hand gestures, comprising:
an offline module to determine a skin tone distribution for a plurality of pixels in a video signal; and
an online module to use the skin tone distribution to conduct one or more blob-based hand gesture determinations with respect to the video signal wherein the online module is to remove non-skin pixels from an input frame associated with the video signal based on the skin tone distribution and sub-sample the input frame to obtain a plurality of modified frames, and wherein the online module includes a feature extraction unit to identify a plurality of blobs in the plurality of modified frames and wherein the online module further includes a pose unit to match one or more poses associated with the plurality of blobs to one or more poses stored in a library and wherein the online module further includes a temporal recognition unit to identify a plurality of observation trajectories for the one or more poses, maintain scores for the plurality of observation trajectories simultaneously, and use the scores to conduct the one or more blob-based hand gesture determinations, wherein the temporal recognition unit includes:
specification logic to identify a set of valid transitions;
compliance logic to identify a plurality of observation sequences in training data and remove one or more observation sequences that are non-compliant with the set of valid transitions;
Hidden Markov Model (HMM) initialization logic to identify one or more clusters of values associated with compliant observation sequences, take a Cartesian product of the one or more clusters of values and use the Cartesian product to define a plurality of HMM states; and
Viterbi logic to determine the scores for the plurality of observation trajectories based on the plurality of HMM states, wherein the blob-based hand gesture determinations are to distinguish between ongoing trajectories, killed trajectories and completed trajectories based on drops in the scores.

27. A method of recognizing hand gestures, comprising:
determining a skin tone distribution for a plurality of pixels in a video signal;
using the skin tone distribution to conduct one or more blob-based hand gesture determinations with respect to the video signal;
receiving a color image associated with a frame of the video signal;
conducting an edge analysis on the color image for each of a plurality of channels;
determining, for each channel in the plurality of channels, a set of Gaussian derivatives;
performing a convolution between the set of Gaussian derivatives and each pixel in the color image to obtain a gradient magnitude and a gradient angle for each pixel in the color image on a per channel basis; and
using a low threshold and a high threshold to determine whether each gradient magnitude and associated gradient angle corresponds to an edge, wherein the low threshold and the high threshold are channel-specific.

28. The method of claim 27, wherein the video signal includes two-dimensional (2D) image data.

29. The method of claim 27, wherein the skin tone distribution has an execution time budget that is greater than an execution time budget of the blob-based hand gesture determinations.

30. The method of claim 27, further including:
building, for each channel in the plurality of channels, a histogram of gradient magnitudes; and
determining the low threshold and the high threshold based on the histogram.

31. The method of claim 27, further including:
   identifying one or more edge pixels; and
   determining whether a neighborhood of pixels around the one or more edge pixels includes additional edge pixels, wherein the neighborhood of pixels includes one or more pixels that are non-adjacent to the one or more edge pixels.

32. The method of claim 27, further including setting a variance parameter of the set of Gaussian derivatives to a value greater than one.

33. The method of claim 27, further including:
   identifying an edge map associated with the edge analysis; and
   iteratively propagating nearest neighbor information between pixels in the edge map to obtain a distance map.

34. The method of claim 33, further including identifying a set of contour line pixels that surround a plurality of fingertips in the color image based on the edge map and the distance map.

35. The method of claim 27, further including:
   removing non-skin pixels from an input frame associated with the video signal based on the skin tone distribution;
   sub-sampling the input frame to obtain a plurality of modified frames; and
   identifying a plurality of blobs in the plurality of modified frames.

36. The method of claim 35, further including matching one or more poses associated with the plurality of blobs to one or more poses stored in a library.

37. A method of recognizing hand gestures, comprising:
   determining a skin tone distribution for a plurality of pixels in a video signal;
   using the skin tone distribution to conduct one or more blob-based hand gesture determinations with respect to the video signal;
   receiving a color image associated with a frame of the video signal;
   conducting an edge analysis on the color image for each of a plurality of channels
   identifying an edge map associated with the edge analysis;
   iteratively propagating nearest neighbor information between pixels in the edge map to obtain a distance map, further including:
   initializing edge pixels in the edge map as being their own nearest edges and having an edge distance of zero;
   adding the initialized edge pixels to a first queue;
   designating the first queue as an active queue;
   initializing non-edge pixels in the edge map as having unknown nearest edges and an edge distance of infinity;
   designating a second queue as an inactive queue;
   conducting, for each pixel in the active queue, a distance determination as to whether a first distance between a neighboring pixel and a nearest edge of the pixel in the active queue is less than or equal to a second distance between the neighboring pixel and a current nearest edge of the neighboring pixel;
   conducting a transfer of a state of the pixel in the active queue to a state of the neighboring pixel if the first distance is less than or equal to the second distance;
   replacing the second distance in the state of the neighboring pixel with the first distance;
   conducting a removal of the pixel in the active queue from the active queue;
   conducting an addition of the neighboring pixel to the inactive queue if the first distance is less than or equal the second distance;
   conducting a first repeat of the distance determination, the transfer of the state and the addition of the neighboring pixel for each neighboring pixel of the pixel in the active queue;
   conducting a first designation of the first queue as the inactive queue;
   conducting a second designation of the second queue as the active queue; and
   conducting a subsequent repeat of the first repeat, the first designation and the second designation until the active queue is empty.

38. A method of recognizing hand gestures, comprising:
   determining a skin tone distribution for a plurality of pixels in a video signal;
   using the skin tone distribution to conduct one or more blob-based hand gesture determinations with respect to the video signal;
   receiving a color image associated with a frame of the video signal;
   conducting an edge analysis on the color image for each of a plurality of channels
   identifying an edge map associated with the edge analysis;
   iteratively propagating nearest neighbor information between pixels in the edge map to obtain a distance map;
   identifying a set of contour line pixels that surround a plurality of fingertips in the color image based on the edge map and the distance map, further including:
   using a set of finger segment curves to identify a plurality of local edge distance minima corresponding to the plurality of fingertips, wherein the plurality of fingertips includes one or more of an index fingertip, a middle fingertip, a ring fingertip, or a pinky fingertip; and
   using the set of finger segment curves to identify four global edge distance minima for contour line pixels associated with each local edge distance minimum, and with the plurality of fingertips.

39. The method of claim 38, wherein the set of finger segment curves includes a concatenation of two line segments and two ellipse segments.

40. A method of recognizing hand gestures, comprising:
   determining a skin tone distribution for a plurality of pixels in a video signal;
   using the skin tone distribution to conduct one or more blob-based hand gesture determinations with respect to the video signal;
   receiving a color image associated with a frame of the video signal;
   conducting an edge analysis on the color image for each of a plurality of channels
   identifying an edge map associated with the edge analysis;
   iteratively propagating nearest neighbor information between pixels in the edge map to obtain a distance map;
   identifying a set of contour line pixels that surround a plurality of fingertips in the color image based on the edge map and the distance map, wherein the skin tone distribution is determined based on color values for pixels inside the set of contour line pixels.

41. A method of recognizing hand gestures, comprising:
   determining a skin tone distribution for a plurality of pixels in a video signal;
   using the skin tone distribution to conduct one or more blob-based hand gesture determinations with respect to the video signal;
   removing non-skin pixels from an input frame associated with the video signal based on the skin tone distribution;
   sub-sampling the input frame to obtain a plurality of modified frames;

identifying a plurality of blobs in the plurality of modified frames, further including:

determining a Hessian trace function;

performing, for each pixel in a modified frame, a convolution between the Hessian trace function and a set of non-adjacent pixels associated with the pixel in the modified frame to obtain a convolution score;

invoking the convolution for a plurality of variance parameter values to obtain a plurality of convolution scores for the pixel in the modified frame; and identifying a blob corresponding to a highest score in the plurality of convolution scores.

42. The method of claim 41, further including using a 9×9 convolution box to perform the convolution.

43. The method of claim 41, wherein the set of non-adjacent pixels have a spacing of a closest integer to two thirds the variance parameter of the Hessian trace function.

44. The method of claim 41, wherein one or more variance parameter values in the plurality of variance parameter values is a one quarter increment of a preceding variance parameter value.

45. The method of claim 41, further including using one or more single instruction multiple data (SIMD) commands and a SIMD convolution method to perform the convolution.

46. A method of recognizing hand gestures, comprising:

determining a skin tone distribution for a plurality of pixels in a video signal;

using the skin tone distribution to conduct one or more blob-based hand gesture determinations with respect to the video signal;

removing non-skin pixels from an input frame associated with the video signal based on the skin tone distribution;

sub-sampling the input frame to obtain a plurality of modified frames;

identifying a plurality of blobs in the plurality of modified frames;

matching one or more poses associated with the plurality of blobs to one or more poses stored in a library, further including:

grouping the plurality of blobs into a plurality of clusters;

forming a density map based on the plurality of clusters; and using the density map to identify the one or more poses.

47. The method of claim 46, further including weighting the plurality of blobs according to blob size, wherein the plurality of clusters are k-means clusters.

48. The method of claim 46, further including using an objective function to identify clusters that satisfy one or more of a compactness condition, a disjointedness condition, or a size threshold condition.

49. The method of claim 46, further including:

normalizing one or more of the blobs with respect to a cluster radius;

scaling up one or more of the blobs based on a size of the density map; and normalizing the density map to obtain a byte grid.

50. The method of claim 46, further including conducting one or more distance calculation operations to identify the one or more poses.

51. A method of recognizing hand gestures, comprising:

determining a skin tone distribution for a plurality of pixels in a video signal;

using the skin tone distribution to conduct one or more blob-based hand gesture determinations with respect to the video signal;

removing non-skin pixels from an input frame associated with the video signal based on the skin tone distribution;

sub-sampling the input frame to obtain a plurality of modified frames;

identifying a plurality of blobs in the plurality of modified frames;

matching one or more poses associated with the plurality of blobs to one or more poses stored in a library, further including:

identifying a plurality of observation trajectories for the one or more poses;

maintaining scores for the plurality of observation trajectories simultaneously; and using the scores to conduct the one or more blob-based hand gesture determinations.

52. The method of claim 51, further including:

identifying a set of valid transitions;

identifying a plurality of observation sequences in training data;

removing one or more observation sequences that are non-compliant with the set of valid transitions;

identifying one or more clusters of values associated with compliant observation sequences;

taking a Cartesian product of the one or more clusters of values;

using the Cartesian product to define a plurality of Hidden Markov Model (HMM) states; and determining the scores for the plurality of observation trajectories based on the plurality of MINI states, wherein the blob-based hand gesture determinations distinguish between ongoing trajectories, killed trajectories and completed trajectories based on drops in the scores.

53. At least one non-transitory computer readable storage medium comprising a set of instructions which, if executed by a computing device, cause the computing device to:

determine a skin tone distribution for a plurality of pixels in a video signal;

use the skin tone distribution to conduct one or more blob-based hand gesture determinations with respect to the video signal receive a color image associated with a frame of the video signal;

conduct an edge analysis on the color image for each of a plurality of channels;

determine, for each channel in the plurality of channels, a set of Gaussian derivatives;

perform a convolution between the set of Gaussian derivatives and each pixel in the color image to obtain a gradient magnitude and a gradient angle for each pixel in the color image on a per channel basis; and use a low threshold and a high threshold to determine whether each gradient magnitude and associated gradient angle corresponds to an edge, wherein the low threshold and the high threshold are channel-specific.

54. The at least one non-transitory computer readable storage medium of claim 53, wherein the video signal is to include two-dimensional (2D) image data.

55. The at least one non-transitory computer readable storage medium of claim 53, wherein the skin tone distribution is to have an execution time budge that is greater than an execution time budge of the blob-based hand gesture determinations.

56. The at least one non-transitory computer readable storage medium of claim 53, wherein the instructions, if executed, cause a computing device to:

build, for each channel in the plurality of channels, a histogram of gradient magnitudes; and determine the low threshold and the high threshold based on the histogram.

57. The at least one non-transitory computer readable storage medium of claim 53, wherein the instructions, if executed, cause a computing device to:
   identify one or more edge pixels; and
   determine whether a neighborhood of pixels around the one or more edge pixels includes additional edge pixels, wherein the neighborhood of pixels is to include one or more pixels that are non-adjacent to the one or more edge pixels.

58. The at least one non-transitory computer readable storage medium of claim 53, wherein the instructions, if executed, cause a computing device to set a variance parameter of the set of Gaussian derivatives to a value greater than one.

59. The at least one non-transitory computer readable storage medium of claim 53, wherein the instructions, if executed, cause a computing device to:
   identify an edge map associated with the edge analysis; and
   iteratively propagate nearest neighbor information between pixels in the edge map to obtain a distance map.

60. The at least one non-transitory computer readable storage medium of claim 59, wherein the instructions, if executed, cause a computing device to identify a set of contour line pixels that surround a plurality of fingertips in the color image based on the edge map and the distance map.

61. The at least one non-transitory computer readable storage medium of claim 53, wherein the instructions, if executed, cause a computing device to:
   remove non-skin pixels from an input frame associated with the video signal based on the skin tone distribution;
   sub-sample the input frame to obtain a plurality of modified frames; and
   identify a plurality of blobs in the plurality of modified frames.

62. The at least one non-transitory computer readable storage medium of claim 61, wherein the instructions, if executed, cause a computing device to match one or more poses associated with the plurality of blobs to one or more poses stored in a library.

63. At least one non-transitory computer readable storage medium comprising a set of instructions which, if executed by a computing device, cause the computing device to:
   determine a skin tone distribution for a plurality of pixels in a video signal;
   use the skin tone distribution to conduct one or more blob-based hand gesture determinations with respect to the video signal;
   receive a color image associated with a frame of the video signal;
   conduct an edge analysis on the color image for each of a plurality of channels;
   identify an edge map associated with the edge analysis; and
   iteratively propagate nearest neighbor information between pixels in the edge map to obtain a distance map;
   initialize edge pixels in the edge map as being their own nearest edges and having an edge distance of zero;
   add the initialized edge pixels to a first queue;
   designate the first queue as an active queue;
   conduct, for each pixel in the active queue, a distance determination as to whether a first distance between a neighboring pixel and a nearest edge of the pixel in the active queue is less than or equal to a second distance between the neighboring pixel and a current nearest edge of the neighboring pixel;
   conduct a transfer of a state of the pixel in the active queue to a state of the neighboring pixel if the first distance is less than or equal to the second distance;
   replace the second distance in the state of the neighboring pixel with the first distance;
   conduct a removal of the pixel in the active queue from the active queue;
   conduct an addition of the neighboring pixel to the inactive queue if the first distance is less than or equal to the second distance;
   conduct a first repeat of the distance determination, the transfer of the state and the addition of the neighboring pixel for each neighboring pixel of the pixel in the active queue;
   conduct a first designation of the first queue as the inactive queue;
   conduct a second designation of the second queue as the active queue; and
   conduct a subsequent repeat of the first repeat, the first designation and the second designation until the active queue is empty.

64. At least one non-transitory computer readable storage medium comprising a set of instructions which, if executed by a computing device, cause the computing device to:
   determine a skin tone distribution for a plurality of pixels in a video signal;
   use the skin tone distribution to conduct one or more blob-based hand gesture determinations with respect to the video signal;
   receive a color image associated with a frame of the video signal;
   conduct an edge analysis on the color image for each of a plurality of channels;
   identify an edge map associated with the edge analysis;
   identify a set of contour line pixels that surround a plurality of fingertips in the color image based on the edge map and the distance map;
   use a set of finger segment curves to identify a plurality of local edge distance minima corresponding to the plurality of fingertips, wherein the plurality of fingertips is to include one or more of an index fingertip, a middle fingertip, a ring fingertip, or a pinky fingertip; and
   use the set of finger segment curves to identify four global edge distance minima for contour line pixels associated with each local edge distance minimum and with each of the plurality of fingertips.

65. The at least one non-transitory computer readable storage medium of claim 64, wherein the set of finger segment curves is to include a concatenation of two line segments and two ellipse segments.

66. At least one non-transitory computer readable storage medium comprising a set of instructions which, if executed by a computing device, cause the computing device to:
   determine a skin tone distribution for a plurality of pixels in a video signal;
   use the skin tone distribution to conduct one or more blob-based hand gesture determinations with respect to the video signal;
   receive a color image associated with a frame of the video signal;
   conduct an edge analysis on the color image for each of a plurality of channels;
   identify an edge map associated with the edge analysis;
   identify a set of contour line pixels that surround a plurality of fingertips in the color image based on the edge map and the distance map, wherein the skin tone distribution is to be determined based on color values for pixels inside the set of contour line pixels.

67. At least one non-transitory computer readable storage medium comprising a set of instructions which, if executed by a computing device, cause the computing device to:
- determine a skin tone distribution for a plurality of pixels in a video signal;
- use the skin tone distribution to conduct one or more blob-based hand gesture determinations with respect to the video signal;
- remove non-skin pixels from an input frame associated with the video signal based on the skin tone distribution;
- sub-sample the input frame to obtain a plurality of modified frames;
- identify a plurality of blobs in the plurality of modified frames;
- determine a Hessian trace function;
- perform, for each pixel in a modified frame, a convolution between the Hessian trace function and a set of non-adjacent pixels associated with the pixel in the modified frame to obtain a convolution score;
- invoke the convolution for a plurality of variance parameters to obtain a plurality of convolution scores for the pixel in the modified frame; and
- identify a blob corresponding to a highest score in the plurality of convolution scores.

68. The at least one non-transitory computer readable storage medium of claim 37, wherein the instructions, if executed, cause a computing device to use a 9×9 convolution box to perform the convolution.

69. The at least one non-transitory computer readable storage medium of claim 67, wherein the set of non-adjacent pixels have a spacing of a closest integer to two thirds the variance parameter of the Hessian trace function.

70. The at least one non-transitory computer readable storage medium of claim 67, wherein one or more variance parameter values in the plurality of variance parameter values is a one quarter increment of a preceding variance parameter value.

71. The at least one non-transitory computer readable storage medium of claim 67, wherein the instructions, if executed, cause a computing device to use one or more single instruction multiple data (SIMD) commands and a SIMD convolution method to perform the convolution.

72. At least one non-transitory computer readable storage medium comprising a set of instructions which, if executed by a computing device, cause the computing device to:
- determine a skin tone distribution for a plurality of pixels in a video signal;
- use the skin tone distribution to conduct one or more blob-based hand gesture determinations with respect to the video signal;
- remove non-skin pixels from an input frame associated with the video signal based on the skin tone distribution;
- sub-sample the input frame to obtain a plurality of modified frames;
- identify a plurality of blobs in the plurality of modified frames;
- match one or more poses associated with the plurality of blobs to one or more poses stored in a library;
- group the plurality of blobs into a plurality of clusters;
- form a density map based on the plurality of clusters; and
- use the density map to identify the one or more poses.

73. The at least one non-transitory computer readable storage medium of claim 72, wherein the instructions, if executed, cause a computing device to weight the plurality of blobs according to blob size, wherein the plurality of clusters are to be k-means clusters.

74. The at least one non-transitory computer readable storage medium of claim 72, wherein the instructions, if executed, cause a computing device to use an objective function to identify clusters that satisfy one or more of a compactness condition, a disjointedness condition, or a size threshold condition.

75. The at least one non-transitory computer readable storage medium of claim 72, wherein the instructions, if executed, cause a computing device to:
- normalize one or more of the blobs with respect to a cluster radius;
- scale-up one or more of the blobs based on a size of the density map; and
- normalize the density map to obtain a byte grid.

76. The at least one non-transitory computer readable storage medium of claim 72, wherein the instructions, if executed, cause a computing device to conduct one or more distance calculation operations to identify the one or more poses.

77. At least one non-transitory computer readable storage medium comprising a set of instructions which, if executed by a computing device, cause the computing device to:
- determine a skin tone distribution for a plurality of pixels in a video signal;
- use the skin tone distribution to conduct one or more blob-based hand gesture determinations with respect to the video signal;
- remove non-skin pixels from an input frame associated with the video signal based on the skin tone distribution;
- sub-sample the input frame to obtain a plurality of modified frames;
- identify a plurality of blobs in the plurality of modified frames;
- match one or more poses associated with the plurality of blobs to one or more poses stored in a library;
- identify a plurality of observation trajectories for the one or more poses;
- maintain scores for the plurality of observation trajectories simultaneously; and
- use the scores to conduct the one or more blob-based hand gesture determinations.

78. The at least one non-transitory computer readable storage medium of claim 77, wherein the instructions, if executed, cause a computing device to:
- identify a set of valid transitions;
- identify a plurality of observation sequences in training data;
- remove one or more observation sequences that are non-compliant with the set of valid transitions;
- identify one or more clusters of values associated with compliant observation sequences;
- take a Cartesian product of the one or more clusters of values
- use the Cartesian product to define a plurality of Hidden Markov Model (HMM) states; and
- determine the scores for the plurality of observation trajectories based on the plurality of HMM states, wherein the blob-based hand gesture determinations are to distinguish between ongoing trajectories, killed trajectories and completed trajectories based on drops in the scores.

* * * * *